US012764115B1

(12) United States Patent
Kshirsagar et al.

(10) Patent No.: US 12,764,115 B1
(45) Date of Patent: Oct. 13, 2026

(54) AUTOMATED STAND-IN SYSTEMS FOR MAINTAINING OPERATIONAL CONTINUITY

(71) Applicant: U.S. BANK NATIONAL ASSOCIATION, Minneapolis, MN (US)

(72) Inventors: Gaurav Ashok Kshirsagar, Cary, NC (US); Akshay Negi, Charlotte, NC (US); Nageswara Rao Muvva, Monroe, NC (US); Andrew Kavie, Blaine, MN (US); Kanika Bhalla, Marietta, GA (US)

(73) Assignee: U.S. BANK NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/630,754

(22) Filed: Mar. 27, 2026

(51) Int. Cl.
*G06F 21/00* (2013.01)
*H04L 9/40* (2022.01)

(52) U.S. Cl.
CPC .................................... *H04L 63/10* (2013.01)

(58) Field of Classification Search
CPC ........................................................ H04L 63/10
See application file for complete search history.

(56) References Cited

U.S. PATENT DOCUMENTS 9,509,684 B1 * 11/2016 Dixson-Boles ....... H04L 63/083
11,582,036 B1 * 2/2023 Chen ......................... H04L 9/14
12,517,864 B2 * 1/2026 Schwerin .............. G06F 16/119
2007/0086433 A1 * 4/2007 Cunetto .................. H04L 51/56 370/468
2020/0403994 A1 * 12/2020 Bitterfeld ............ H04L 63/0884
2022/0353295 A1 * 11/2022 Yeh ........................ H04L 63/029
2023/0206329 A1 * 6/2023 Cella ................... G06F 21/6245
2025/0023918 A1 * 1/2025 Sethi ................... H04L 63/1425
2025/0252208 A1 * 8/2025 Iluz ...................... G06F 21/6227
2025/0310352 A1 * 10/2025 Garg ................... H04L 63/1416
2026/0100935 A1 * 4/2026 Ruia ................... H04L 63/0281

* cited by examiner

*Primary Examiner* — Kendall Dolly
(74) *Attorney, Agent, or Firm* — Alston & Bird LLP

(57) ABSTRACT

Various embodiments are directed to apparatuses, methods, computer-readable media, computer program products, and systems related to maintaining a proxy state log to facilitate operational continuity during system outages. In some embodiments, the method may comprise maintaining, a proxy state log comprising last-known available resource data; responsive to a first operational state change associated with a resource control system, switching the resource authorization system to a stand-in operational state in which the resource authorization system uses data from the proxy state log; updating the proxy state log based on a resource access request processed by the resource authorization system during the stand-in operational state; and responsive to a second operational state change associated with the resource control system: switching the resource authorization system to a default operational state in which the resource authorization system uses data from the resource control system; and performing a reconciliation operation.

20 Claims, 13 Drawing Sheets

600

700

800

AUTOMATED STAND-IN SYSTEMS FOR MAINTAINING OPERATIONAL CONTINUITY

BACKGROUND

Existing technology cannot effectively and autonomously maintain system stability and operational continuity, particularly in large-scale, dependency-driven enterprise environments, where failures in one system routinely propagate into widespread outages due to architectural and operational limits and current technological deficiencies. Applicant has identified a number of additional challenges associated with maintaining operational continuity for systems during partial or complete outages of interdependent systems. Through applied effort, ingenuity, and innovation many deficiencies of existing systems have been solved by developing solutions that are in accordance with the embodiments as discussed herein, many examples of which are described in detail herein.

BRIEF DESCRIPTION OF DRAWINGS

Non-limiting and non-exhaustive examples are described with reference to the following figures.

Reference will now be made to the accompanying drawings, which are not necessarily drawn to scale, and wherein.

DETAILED DESCRIPTION

Figure 1:
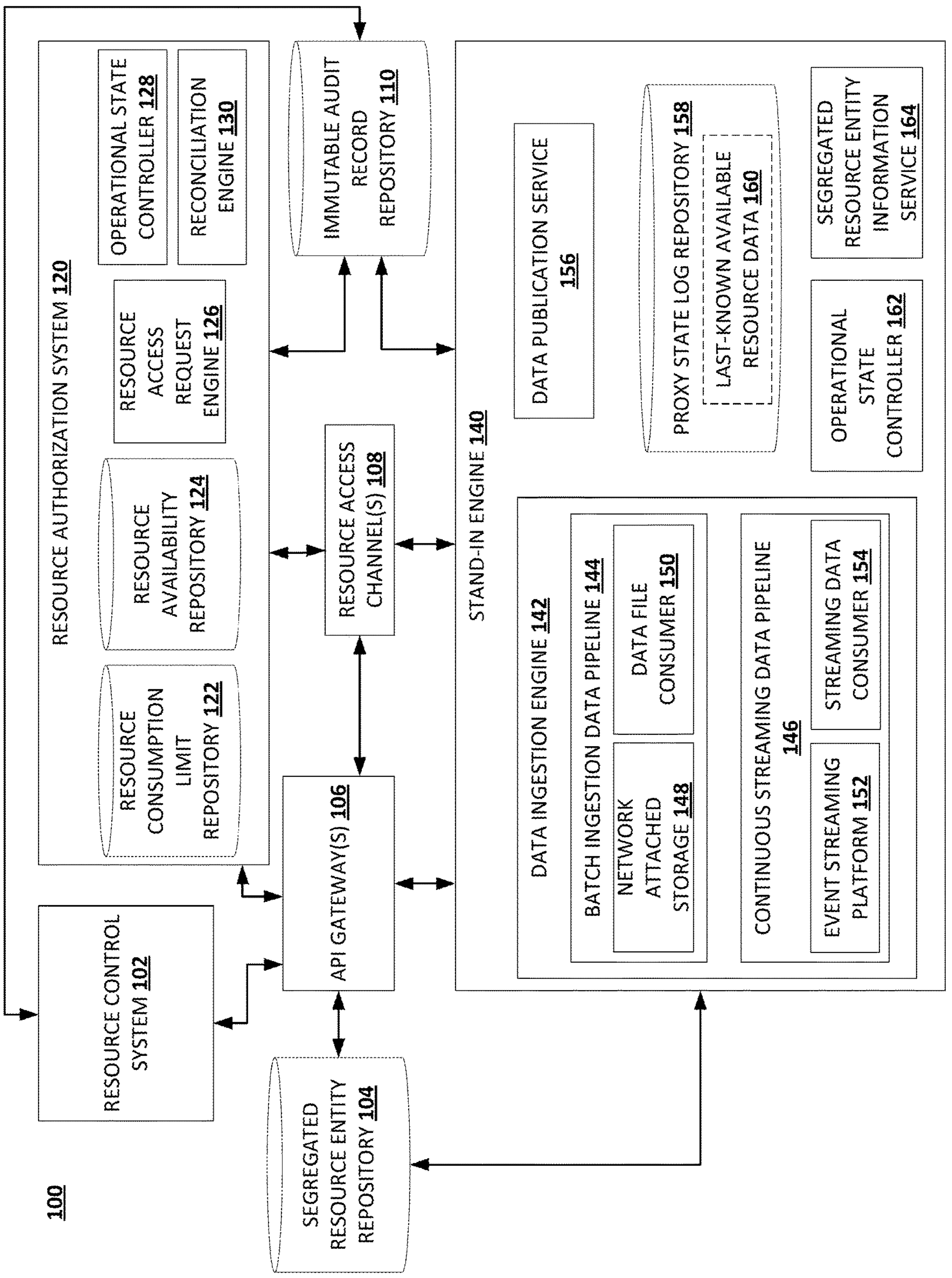
FIG. 1 illustrates an example system environment within which at least some embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout. While values for dimensions of various elements may be disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Overview

In many enterprise environments, critical services depend on authoritative systems that maintain definitive data used to process high-volume requests. For example, core banking systems or central ledger platforms may serve as the authoritative source of truth for resource availability, consumption limits, account metadata, and other data needed to make accurate authorization decisions for payment transactions, funds transfers, balance inquiries, or other resource access operations. Such authoritative systems may process requests originating from multiple channels, including real-time payment networks, wire transfer systems, or internal transfer mechanisms, and may maintain data for millions of segregated resource entities. When these authoritative systems experience planned maintenance windows or unplanned outages, dependent services may be forced to decline or delay otherwise-valid requests because the authoritative data cannot be queried in real time, causing transaction failures, inconsistent customer experiences, service level agreement violations, and operational disruption.

Some undesirable existing approaches to mitigate such issues rely on manual intervention, coarse fallback modes, or limited resiliency mechanisms that address failures in communication channels rather than failures of the underlying authoritative system itself. For example, some fallback mechanisms focus on payment rail failures or alternative routing rather than providing account-level resiliency when the core ledger is unreachable. Additionally, some approaches lack integrated mechanisms for maintaining current, last-known authoritative data for decisioning during an outage, for preventing overallocation when multiple concurrent requests are processed without access to the authoritative system, and for reconciling outage-time decisions back into the authoritative system after recovery in a safe and deterministic manner. As a result, outages may force dependent systems to decline or delay otherwise-valid requests, leading to customer dissatisfaction and operational inefficiency.

Embodiments of the present disclosure address these and other challenges by providing an architecture in which operational continuity is enabled by a proxy state log that maintains last-known available resource data used to process resource access requests when an authoritative resource control system is unavailable. In some embodiments, the proxy state log is maintained and accessed cooperatively by a stand-in engine and a resource authorization system, such that the resource authorization system may switch from using data received from the resource control system during a default operational state to using last-known available resource data from the proxy state log during a stand-in operational state. Upon recovery of the resource control system, a reconciliation operation updates the resource control system based on the proxy state log to synchronize data that changed during the outage. In this manner, the proxy state log serves as a shared data layer that enables the resource authorization system to maintain operational continuity independently of the availability of the authoritative resource control system.

Some embodiments provide technical improvements by continuously ingesting data into the proxy state log using heterogeneous data pipelines. For example, batch ingestion data pipelines may provide periodic bulk updates and continuous streaming data pipelines may provide real-time updates, enabling the proxy state log to maintain stand-in readiness with low staleness across large volumes of segregated resource entities. In some embodiments, the proxy state log stores not only last-known resource availability data but also resource consumption limit data and segregated resource entity metadata sufficient to support authorization decisions when the resource control system is unreachable. In this manner, the combination of batch ingestion data pipelines and continuous streaming data pipelines enables the proxy state log to maintain current data from the resource control system so that the resource authorization system may seamlessly transition to using the proxy state log when the resource control system becomes unavailable.

Some embodiments provide technical improvements by autonomously detecting operational state changes of the resource control system and coordinating operational state transitions among related systems. For example, an operational state controller may monitor one or more system status indicators, and responsive to determining the resource control system is in an outage state, cause the resource authorization system to enter a stand-in operational state in which the proxy state log is used without synchronizing with the resource control system. Similarly, responsive to determining the resource control system has returned to a default operational state, the operational state controller may cause the resource authorization system to exit the stand-in operational state and resume using data from the resource control system. By autonomously detecting outage conditions and coordinating the transition between operational states, embodiments enable faster and more reliable response to both planned and unplanned outage events, thereby improving operational continuity for dependent systems.

Some embodiments provide technical improvements by enabling authorization decisions during stand-in operation using the proxy state log while preventing correctness failures that can arise when many concurrent requests are evaluated against stale or inconsistent data. In some embodiments, the resource authorization system applies processing locks to enforce sequential processing of resource access requests for a given segregated resource entity, thereby preventing race conditions that could otherwise lead to over-allocation or incorrect approvals during an outage state. In some embodiments, authorization computations are performed by selecting an applicable resource availability category from among multiple resource availability categories using a resource availability-state hierarchy, and by applying resource hold data that reflects net stand-in activity to last-known available resource data to derive an effective available value for decisioning.

Some embodiments provide technical improvements by enabling the resource authorization system to process resource access requests from multiple resource access channels during the stand-in operational state. For example, resource access requests may originate from various channels, including real-time payment networks, wire transfer systems, or internal transfer mechanisms, and the resource authorization system may process such requests using data from the proxy state log when the resource control system is unavailable. In some embodiments, the resource authorization system may apply channel-specific policy configurations during the stand-in operational state, enabling consistent enforcement of channel-specific rules regardless of the operational state of the resource control system.

Some embodiments provide technical improvements by persisting stand-in activity in the proxy state log so that such activity may be reconciled with the resource control system upon recovery. For example, the resource authorization system may generate resource reservation locks and update resource hold data responsive to authorization outcomes during the stand-in operational state. In some embodiments, resource reservation locks are configured with predetermined durations to expiration to facilitate automated clearance of stale or non-settling stand-in approvals during recovery, thereby reducing the risk of drift between data sources or erroneous resource allocations.

Some embodiments provide technical improvements by performing automated recovery and reconciliation operations when the resource control system returns to a default operational state. In some embodiments, a reconciliation engine updates the resource control system using data from the proxy state log and data from an immutable audit record by applying deterministic rules based on timestamp data or data version information to merge stand-in deltas, synchronize resource availability data and resource consumption limit data, and clear expired resource reservation locks. This recovery architecture reduces manual reconciliation, supports predictable restoration of authoritative state, and enables safe transition from stand-in decisioning back to normal operation.

Some embodiments provide technical improvements by generating comprehensive auditability for stand-in decisioning and recovery operations. For example, an immutable audit record may log data characterizing proxy state log reads and writes, authorization decisions during stand-in operation, resource reservation locks, and reconciliation merges, thereby supporting compliance, fraud management, and operational transparency without requiring modifications to the authoritative resource control system.

Accordingly, embodiments of the present disclosure provide technical improvements at least by (i) maintaining a proxy state log comprising last-known available resource data using data received from a resource control system, (ii) switching the resource authorization system to a stand-in operational state in which the resource authorization system uses data from the proxy state log without synchronizing with the resource control system responsive to a first operational state change associated with the resource control system, (iii) updating the proxy state log based on a resource access request processed by the resource authorization system during the stand-in operational state, and responsive to a second operational state change associated with the resource control system, (iv) switching the resource authorization system to a default operational state in which the resource authorization system uses data from the resource control system, and (v) performing a reconciliation operation to update the resource control system based on the proxy state log. By enabling continued authorization decisions during authoritative system outages while preserving correctness, traceability, and automated recovery, embodiments improve security, capability, and efficiency for systems operating in interdependent system environments.

Definitions

As used herein, the term "resource control system" refers to a computer-implemented system configured to perform one or more functions associated with resource access. In some embodiments, a resource control system may include hardware, software, or hardware with enabling software configured to coordinate with one or more other systems or services to provide one or more services for one or more users or other systems or services. For example, the resource control system may be configured to serve as an authoritative source of resource access related data. In some embodiments, the resource control system may maintain definitive data across a plurality of systems or services. In some embodiments, the resource control system may share computing hardware and at least some software with one or more other systems or components of various systems described herein or may utilize its own hardware or software. In some embodiments, the resource control system may comprise one or more processors, one or more non-transitory computer-readable media storing computer program instructions, or one or more communication interfaces for exchanging data with other systems. In some embodiments, the resource control system may be deployed across one or more computing devices, including servers, distributed computing clusters, or cloud-based infrastructure. In some embodiments, the resource control system may maintain one or more data stores for persisting data, including databases, caches, logs, or other storage mechanisms configured to store and retrieve data associated with the functions performed by the resource control system.

In some examples, the resource control system may be a central resource management system for an enterprise or a specific subset of resources associated with an enterprise (e.g., a core banking system, a core computer resource handler or scheduler) configured to maintain definitive data across a plurality of systems. In some examples, the resource control system may maintain resource availability data, resource consumption limit data, segregated resource entity metadata, resource access request metadata, auditing data, or other resource access related data for a plurality of segregated resource entities. In some embodiments, the resource control system may be configured to communicate with other systems via one or more communication protocols, including application program interfaces (APIs), message queues, data pipelines, or other data exchange mechanisms. In some embodiments, the resource control system may implement security measures including authentication, authorization, encryption, or access control mechanisms to protect data and ensure secure communications with other systems.

In some embodiments, the resource control system may be associated with an operational state characterizing availability or performance of the resource control system. For example, the resource control system may be in a default operational state where the resource control system is available for access by other systems or operating within expected or defined performance thresholds. In another example, the resource control system may be in an outage state where the resource control system is unavailable for access by other systems or not operating within expected or defined performance thresholds. In some embodiments, the resource control system may be associated with system status indicators that, for example, characterize an operational state the resource control system is in. For example, system status indicators may include application program interface (API) response codes, message queue depth indicators, message queue lag indicators, or circuit breaker events.

In some embodiments, the resource control system may provide data to or receive data from the proxy state log. For example, during a default operational state of the resource control system, data from the resource control system may be received by the proxy state log. In another example, responsive to the resource control system switching from an outage state to a default operational state, the resource control system may receive data from the proxy state log (e.g., in association with a reconciliation operation). For example, one or more data stores of the resource control system may be synchronized with or otherwise updated based on the proxy state log to bring the resource control system up to date with data maintained by the proxy state log during the outage state of the resource control system.

As used herein, the term "resource authorization system" refers to a computer-implemented system configured to perform one or more functions associated with resource access. In some embodiments, the resource authorization system may include hardware, software, or hardware with enabling software configured to coordinate with one or more other systems or services to provide one or more services for one or more users or other systems or services. For example, the resource authorization system may be configured to process resource access requests. In some embodiments, the resource authorization system may process resource access requests based on resource access related data received from the resource control system or proxy state log. In some embodiments, the resource authorization system may share computing hardware and at least some software with one or more other systems or components of various systems described herein (e.g., the stand-in engine) or may utilize its own hardware or software. In some embodiments, the resource authorization system may comprise one or more processors, one or more non-transitory computer-readable media storing computer program instructions, or one or more communication interfaces for exchanging data with other systems. In some embodiments, the resource authorization system may be deployed across one or more computing devices, including servers, distributed computing clusters, or cloud-based infrastructure. In some embodiments, the resource authorization system may maintain one or more data stores for persisting data, including databases, caches, logs, or other storage mechanisms configured to store and retrieve data associated with the functions performed by the resource authorization system.

In some examples, the resource authorization system may be configured to authorize or deny resource access requests to access or use various resources using definitive data maintained by the resource control system. In some examples, the resource authorization system may query, monitor, or receive data from the resource control system to facilitate one or more functionalities of the resource authorization system (e.g., process resource access requests). In some embodiments, the resource authorization system may be configured to communicate with other systems via one or more communication protocols, including application program interfaces (APIs), message queues, data pipelines, or other data exchange mechanisms. In some embodiments, a resource authorization system may implement security measures including authentication, authorization, encryption, or access control mechanisms to protect data and ensure secure communications with other systems.

In some embodiments, the resource authorization system may be associated with an operational state characterizing availability or performance of the resource authorization system. For example, the resource authorization system may be in a default operational state where the resource authorization system uses data from the resource control system. In another example, the resource authorization system may be in a stand-in operational state where the resource authorization system uses data from the proxy state log without synchronizing with the resource control system. In some embodiments, the resource authorization system may change operational states in response to an operational state change in the resource control system. For example, the resource authorization system may be dependent upon data from the resource control system during a default operational state and may switch to a stand-in operational state responsive to the resource control system switching from a default operational state to an outage state. Continuing this example, the resource authorization system may switch to a default operational state responsive to the resource control system switching back to the default operational state.

In some embodiments, the resource authorization system may monitor system status indicators to determine when to switch operational states. For example, the resource authorization system or a related system or service (e.g., the stand-in engine) may monitor system status indicators of the resource control system so that the resource authorization system may change operational states in association with operational state changes of the resource control system (e.g., changing to a default operational state or stand-in operational state dependent upon the operational state of the resource control system). In some embodiments, during a stand-in operational state of the resource authorization system, the resource authorization system may receive data from the proxy state log without synchronizing with the resource control system.

As used herein, the term "proxy state log" refers to a data entity configured to maintain data used to facilitate operational continuity for one or more systems or services. In some examples, the proxy state log may include, be embodied by, or otherwise associated with one or more distributed database systems, in-memory data stores, persistent storage systems or caching layers, or other data storage systems. In some embodiments, the proxy state log may include software, hardware, or hardware with enabling software configured to receive, maintain, and facilitate access to various data. In some embodiments, the proxy state log may share computing hardware and at least some software with one or more other systems or components of various systems described herein (e.g., the resource authorization system) or may utilize its own hardware or software. In some examples, the proxy state log may store last-known available resource data, resource hold data, segregated resource entity metadata, or other resource access related data. For example, the proxy state log may maintain last-known available resource data by consuming data received from a resource control system so that an associated resource authorization system may use the proxy state log when the resource control system is in an outage state. In some embodiments, the proxy state log may be continuously updated with data received from or otherwise associated with the resource control system. In some examples, the proxy state log may ingest data via various data pipelines or data sources such as one or more batch ingestion data pipelines, continuous streaming data pipelines, or combinations thereof during a default operational state of the resource control system.

In some embodiments, the proxy state log may be configured to maintain data used to configure the resource control system, for example, after an outage state. In some embodiments, the proxy state log may be updated based on resource access requests processed by the resource authorization system during a stand-in operational state. For example, the proxy state log may receive and maintain resource access related data during an outage state of the resource control system and, responsive to the resource control system switching to a default operational state, the resource control system may be updated based on or using the proxy state log. For example, when a resource access request is authorized during a stand-in operational state, the proxy state log may be updated to reflect resource hold data characterizing the net change to the last-known available resource data. For example, the proxy state log may be used during reconciliation operations to update the resource control system with changes that occurred during the stand-in operational state.

In some embodiments, the proxy state log may be configured to record resource access requests processed or authorized by the resource authorization system during a stand-in operational state. In some embodiments, the resource access requests recorded by the proxy state log may be combined across one or more variables (e.g., as resource hold data aggregated per segregated resource entity). In some embodiments, in association with the resource control system becoming available following unavailability, the resource access requests or associated data maintained by the proxy state log during the unavailability may be reconciled with the resource control system.

As used herein, the term "resource access related data" refers to data associated with the allocation, availability, consumption, or management of resources, such as in association with one or more segregated resource entities. In some embodiments, resource access related data may include resource availability data, resource consumption limit data, resource hold data, segregated resource entity metadata, resource reservation locks, other resource access related metadata, or other data used to process, track, or govern resource access requests. In some examples, resource access related data may be maintained by the resource control system or the resource authorization system, stored in the proxy state log, or recorded in the immutable audit record.

As used herein, the term "last-known available resource data" refers to data maintained by the proxy state log and associated with one or more segregated resource entities as last provided by or received from a data source. For example, last-known available resource data may include the latest resource access related data received from or in association with a resource control system (or component thereof), for example, prior to an outage state of the resource control system. In some embodiments, last-known available resource data may include resource availability data, resource consumption limit data, or other resource access related data. In some examples, last-known available resource data may be continuously updated with data received from monitoring the resource control system, for example, during a default operational state. In some examples, last-known available resource data may be updated via batch ingestion data pipelines, continuous streaming data pipelines, or other monitored data pipelines.

As used herein, the term "segregated resource entity" refers to a data entity for which resource access related data is maintained or associated. In some embodiments, a segregated resource entity may be an account, pool, partition, or cluster, or another discrete allocation of resources that can be independently maintained. In some examples, a segregated resource entity may be used to define, bound, or associate one or more resources or resource access related data. For example, a segregated resource entity may be an entity for which resource availability data, resource consumption limit data, or segregated resource entity metadata (e.g., account metadata, customer information metadata, etc.) are maintained. For example, resource access related data associated with the resource control system, resource authorization system, or the proxy state log may be associated with one or more segregated resource entities. In an example, the resource control system may be a resource management system configured to maintain and process resource access related data for resources assigned to, used by, or otherwise associated with segregated resource entities. In some embodiments, segregated resource entities associated with the resource control system, the resource authorization system, or the proxy state log may be idempotent. In some embodiments, processing a resource access request may include identifying at least one segregated resource entity associated with the resource access request using segregated resource entity metadata.

As used herein, the term "resource availability data" refers to data indicating a measure of resources available, such as in association with a segregated resource entity. For example, a segregated resource entity may be associated with 10 units of a resource, and the resource availability data for the segregated resource entity may include a corresponding resource availability value of 10 units. In some embodiments, resource availability data may include one or more resource availability categories, each indicating a different measure of resources. For example, the resource control system may maintain multiple resource availability categories for a segregated resource entity to account for systematic variation in the allocation or consumption of resources, for example, due to different processing states associated with resource access requests (e.g., pending versus settled resource access requests).

In some examples, resource availability data for a segregated resource entity may include one resource availability category being a measure of resources currently allocated to the segregated resource entity (e.g., based on fully settled and processed resource access requests only), another resource availability category being a measure resources accessible for immediate consumption (e.g., based on fully settled and pending resource access requests or holds for expected resource access requests), or yet another resource availability category being a measure of a threshold amount of resources configured to remain in reserve. In some embodiments, resource availability values for different resource availability categories may be calculated using different methodologies or may reflect different temporal states of a resource, such as end-of-day values versus real-time values. In some examples, a plurality of resource availability categories may be used in conjunction with a resource availability-state hierarchy to determine which resource availability category to use for processing resource access requests.

As used herein, the term "resource availability-state hierarchy" refers to a data object characterizing a predetermined rank order used to select a resource availability category from among a plurality of resource availability categories. For example, a resource availability-state hierarchy may be used to select a resource availability category from resource availability data for processing resource access requests. In some embodiments, a resource availability-state hierarchy may be used to select a resource availability category based on precedence rules. For example, a resource availability-state hierarchy may establish an ordering among different types of resource availability categories, with higher-precedence resource availability categories being selected over lower-precedence resource availability categories when multiple resource availability categories are available.

In some embodiments, the resource availability-state hierarchy may be applied during processing of resource access requests to ensure consistent selection of resource availability categories. For example, when determining whether to authorize or deny a resource access request, the resource authorization system may select a resource availability category based on precedence rules established by a resource availability-state hierarchy. In some examples, a resource availability-state hierarchy may be configured to reflect enterprise preferences, configurations, regulations, resource access requirements, or the like governing resource access.

As used herein, the term "resource consumption limit data" refers to data indicating a threshold configured to govern access to a resource, such as for a segregated resource entity. For example, resource consumption limit data may include a resource consumption limit indicating a restriction to access of a resource for a segregated resource entity based on certain parameters. In some examples, a resource consumption limit may govern access to a resource in association with or based on an amount of the resource being accessed, a frequency of access to the resource, a channel or system being used to access the resource, enterprise-level policies associated with accessing the resource, or the like. In some examples, resource consumption limit data may be received from the resource control system or stored in the proxy state log as part of the last-known available resource data.

As used herein, the term "resource hold data" refers to data that defines or characterizes provisionally allocated resources associated with a segregated resource entity, such as in association with processing one or more resource access requests. In some embodiments, resource hold data may correspond to a value of resource access data associated with resource access requests that have been approved but not reconciled relative to last-known available resource data. For example, resource hold data may characterize a modification or write limit associated with resource availability data, resource consumption limit data, or other resource access related data, preventing modification of such data for a value associated with the resource hold data. In some embodiments, resource hold data may characterize a net change or update for resource access related data (e.g., a net change to be applied to the last-known available resource data caused by a resource authorization system processing one or more resource access requests during a stand-in operational state). In some embodiments, the net change or update may be applied during a reconciliation operation or following reconnection with or default operation of the resource control system (e.g., in association with resource access requests awaiting reconciliation with the resource control system). In some embodiments, resource hold data may be maintained or aggregated during an outage state or stand-in operational state.

For example, resource hold data may characterize a net change to resource availability data for a segregated resource entity as a result of the resource authorization system processing a plurality of resource access requests during an outage state of the resource control system. In some embodiments, resource hold data may be used to update resource access related data or process resource access requests or may be maintained in parallel with a separate ledger of resource access requests to be maintained (e.g., resource reservation locks). In some embodiments, resource hold data may be maintained by the proxy state log and updated responsive to processing a resource access request or other events impacting resource access related data. In some examples, resource hold data may be tracked for a segregated resource entity as the sum of resources available or the sum of resources used. In some embodiments, resource hold data may be incremented or decremented in accordance with each resource access request processed (e.g., decrementing a measure of resources used in response to a deposit of resources or incrementing a measure of resources used in response to a withdrawal of resources).

For example, resource hold data may be used by the resource authorization system to account for resources that have been provisionally allocated but not yet confirmed with the associated resource control system (e.g., due to the resource control system being in an outage state) to prevent overuse of resources or resource consumption limits. For example, during a stand-in operational state, a resource authorization system may use resource hold data and last-known available resource data to determine resource availability data and resource consumption limit data applicable to processing a resource access request. In some embodiments, the data flow may occur in reverse (e.g., with the resource hold data being determined based on the resource availability data and resource consumption limit data). In some examples, resource hold data may be calculated as a percentage of the last-known available resource data or as a fixed amount based on predetermined rules.

In a non-limiting contextual example, a resource authorization system may calculate whether to approve or deny a resource access request by applying the resource hold data to the last-known available resource data to determine effective or stand-in available resources. For example, if the last-known available resource data indicates a segregated resource entity has 100 units of a resource and a resource hold balance indicates 25 units have been provisionally allocated (e.g., approved by the resource authorization system but pending reconciliation with the resource control system), the effective available resource value would be 75 units. Accordingly, a resource access request configured to consume 30 units may be approved because the available resource value is greater than the resource access request consumes. Following approval of the resource access request, the resource hold data may be updated to indicate 55 units have been provisionally allocated. In another example, the resource hold data may be updated to indicate 45% of the resources remain available or 55% of the resources have been provisionally allocated. If another resource access request seeks to consume 60 units, the resource access request may be rejected because, by applying the resource hold data indicating 55 provisionally allocated units to the last-known available resource data, the effective available resource value is 45 and less than the resource access request would consume.

As used herein, the term "resource access request" refers to a data entity or computer-implemented process that may result in the allocation or movement of resources. For example, a resource access request may be configured to access, consume, use, or apply changes to resources associated with a segregated resource entity. In some embodiments, a resource access request may be a payment authorization request, a balance inquiry, a funds transfer request, a deposit, or another type of request that requires verification against resource access related data for a segregated resource entity. In some examples, resource access requests may be received from various payment rails or channels and processed by the resource authorization system.

In some embodiments, processing a resource access request may include placing a processing lock on a segregated resource entity associated with the resource access request, determining whether to authorize or deny the resource access request using the proxy state log, or updating the proxy state log based on the authorization decision. For example, processing a resource access request may include comparing a requested amount of resources against resource availability data, resource consumption limit data, or resource hold data for the associated segregated resource entity. In some examples, processing a resource access request may result in generation of a resource reservation lock characterizing a provisional change to the last-known available resource data. In some embodiments, processing a resource access request may include updating an immutable audit record with data characterizing the resource access request or outcome of processing the resource access request.

As used herein, the term "processing lock" refers to a computer-implemented restriction applied during processing of a resource access request to enforce sequential processing of a plurality of resource access requests during a stand-in operational state. In some examples, a processing lock may be implemented using database locking mechanisms, distributed locking services, or other concurrency control techniques. For example, a processing lock may be configured to engage during processing of individual resource access requests to prevent the resource authorization system from performing concurrent processing of multiple resource access requests for a given segregated resource entity. In some examples, a processing lock may ensure that each resource access request is processed sequentially, for example, with the proxy state log being updated after each request before the next resource access request is processed.

In some embodiments, a processing lock may be released after processing of a resource access request is complete, with or without reconciliation with the resource control system, allowing subsequent resource access requests for the same segregated resource entity to be processed. For example, when a resource access request is received for a segregated resource entity, the resource authorization system may acquire a processing lock for that segregated resource entity, process the resource access request, update the proxy state log, update the immutable audit record, and release the processing lock.

In some embodiments, processing locks may be used to ensure integrity of resource hold data or accuracy of authorization decisions during a stand-in operational state. For example, because resource hold data may characterize cumulative changes to last-known available resource data, concurrent processing of multiple resource access requests without processing locks may result in race conditions where resource hold data is read by multiple processes before any process updates the resource hold data, potentially leading to incorrect authorization decisions. In some examples, processing locks may prevent scenarios where multiple resource access requests are simultaneously evaluated against stale resource hold data, which may result in approving resource access requests that should be denied or denying resource access requests that should be approved.

In a non-limiting contextual example, during an outage state of a resource control system, a resource authorization system may receive two concurrent resource access requests for a segregated resource entity having last-known available resource data indicating 100 units and resource hold data indicating 0 units provisionally allocated. If both resource access requests are configured to consume 80 units and are processed concurrently without processing locks, both processes may read the resource hold data as 0 units, calculate an effective available resource value of 100 units, and approve both resource access requests. However, approving both requests would result in 160 units being provisionally allocated against only 100 available units, causing an over-allocation. By using processing locks to enforce sequential processing, the first resource access request would be processed and the resource hold data updated to 80 units before the second resource access request is evaluated, resulting in the second request being correctly denied because the effective available resource value would be 20 units at the time of processing.

As used herein, the term "resource reservation lock" refers to a data entity configured to characterize a provisional change to resource access related data for a segregated resource entity associated with a resource access request. In some embodiments, a resource reservation lock may characterize or represent a processed resource access request and used to reconcile provisional allocations of resources with the resource control system. In some embodiments, a resource reservation lock may be configured with a predetermined duration to expiration. For example, a resource reservation lock may represent a temporary hold on resources for a segregated resource entity pending confirmation or settlement of an associated resource access request. In some embodiments, a resource reservation lock may be stored in the proxy state log, the immutable audit record, or may include information identifying the associated resource access request, the amount of resources reserved, a time-to-live value indicating when the resource reservation lock expires, or other resource access related data.

In some embodiments, a resource reservation lock may be cleared or resolved in association with reconciliation operations based on the corresponding predetermined duration to expiration. For example, expired resource reservation locks may be automatically cleared during a reconciliation operation when the resource control system switches to a default operational state. In some embodiments, a resource reservation lock may be used to prevent misallocation of resources during a stand-in operational state by accounting for provisionally reserved resources when reconciling with the resource control system. In some embodiments, a resource reservation lock may be used to facilitate reconciliation operations or auditing operations by providing a record of resource access requests processed during an outage state.

In some embodiments, the predetermined duration to expiration may be configured to facilitate removal of a resource reservation lock in a case where a resource access request is received and provisionally processed during a stand-in operational state but ultimately does not settle or complete. For example, a resource access request may be authorized by the resource authorization system during an outage state of the resource control system, resulting in generation of a resource reservation lock and corresponding updates to resource hold data. However, the resource access request may subsequently fail to complete due to external factors, such as rejection by a third-party system, cancellation by a requesting entity, network failures preventing final confirmation, or expiration of the resource access request itself. In such cases, when the resource control system returns to a default operational state and a reconciliation operation is performed, no corresponding settled record may exist in the resource control system for the provisionally processed resource access request. Accordingly, the predetermined duration to expiration may be configured to ensure that such stale resource reservation locks are automatically cleared and corresponding provisional resource allocations may be reversed.

As used herein, the term "operational state change" refers to a change in the availability, performance, or functional status of a system or service. For example, the resource control system or the resource authorization system may experience operational state changes from one operational state to another operational state in association with changes to performance or capabilities thereof. In some embodiments, an operational state change may be defined by one or more system status indicators satisfying one or more thresholds (e.g., a system becoming unresponsive or failing to perform as expected). In some embodiments, operational state changes in the resource control system may trigger operational state changes in the resource authorization system. For example, the resource authorization system may switch from a default operational state to a stand-in operational state responsive to the resource control system changing from a default operational state to an outage state. In another example, the resource authorization system may switch from a stand-in operational state to a default operational state responsive to the resource control system changing from an outage state to a default operational state. In some examples, an operational state change may be a planned outage state or an unplanned outage state.

In some embodiments, an operational state change comprising an unplanned outage state may be identified by monitoring one or more system status indicators to determine the resource control system is unavailable or failing to operate in accordance with one or more thresholds. For example, the resource authorization system may monitor API response codes, message queue depth indicators, message queue lag indicators, or circuit breaker events (e.g., when a predetermined number of consecutive system failures or performance errors occur within a specified time window) to detect when the resource control system experiences an operational state change. In some embodiments, an operational state change comprising a planned outage state may be identified by receiving an indication characterizing the operational state change (e.g., a time and duration of a scheduled maintenance window during which the resource control system is unavailable).

As used herein, the term "stand-in operational state" refers to an operational state in which the resource authorization system uses data from the proxy state log to facilitate one or more functionalities of the resource authorization system. For example, the resource authorization system may operate in a stand-in operational state because the resource control system that the resource authorization system relies on is in an outage state and the resource authorization system cannot synchronize with the resource control system. Accordingly, a stand-in operational state may enable the resource authorization system to maintain operational continuity by switching to relying on the proxy state log. In some embodiments, the resource authorization system may enter a stand-in operational state responsive to detecting an operational state change associated with the resource control system. In some embodiments, during a stand-in operational state, the resource authorization system may authorize or deny resource access requests using the last-known available resource data stored in the proxy state log.

In some embodiments, a resource authorization system may update the proxy state log based on resource access requests processed during a stand-in operational state. For example, in association with authorizing a resource access request during a stand-in operational state, the resource authorization system may update resource hold data or generate resource reservation locks to track provisional changes to the last-known available resource data. In some embodiments, a resource authorization system may facilitate the maintenance of an immutable audit record of all activity during a stand-in operational state, for example, to support reconciliation operations or compliance requirements.

As used herein, the term "default operational state" refers to an operational state of a system or service in which the system or service is available for access by other systems or services and is operating normally (e.g., within expected or defined performance thresholds). In some embodiments, during a default operational state, a system may perform one or more functions and maintain an operational relationship with at least one other system. For example, during a default operational state of the resource authorization system, the resource authorization system may use data received from the resource control system. In another example, during a default operational state of the resource control system, the resource control system may maintain performance within one or more thresholds and remain available for access by the resource authorization system. In some embodiments, during a default operational state, the resource authorization system may synchronize with the resource control system (e.g., query the resource control system for resource access related data to process resource access requests). In some embodiments, the resource authorization system may switch to a default operational state responsive to the resource control system switching to a default operational state (e.g., becoming available following an outage).

As used herein, the term "outage state" refers to an operational state in which a system or service is unavailable for access or is not operating normally (e.g., within expected or defined performance thresholds or not performing one or more expected functions). In some embodiments, an outage state may be a planned outage state or an unplanned outage state. For example, a planned outage state may be associated with scheduled maintenance activities for a system and may be identified by receiving an indication characterizing a predetermined time, duration, or interval during which the system is planned to be unavailable. In another example, an unplanned outage state may be identified by monitoring one or more system status indicators to determine whether a system is unavailable or failing to operate in accordance with one or more thresholds. In some embodiments, an outage state of the resource control system may trigger an operational state change in the resource authorization system.

As used herein, the term "system status indicator" refers to a data entity used to determine an operational state or detect an operational state change of a system or service. In some embodiments, system status indicators may include API response codes, message queue depth indicators, message queue lag indicators, circuit breaker events, or other indicators of a system's status or functionality (e.g., system monitoring or observability signals or notifications). In some embodiments, the resource authorization system may monitor one or more system status indicators to determine when the resource control system has experienced an operational state change or to trigger an operational state change.

In some embodiments, API response codes may indicate the performance or availability of a system based on responses received from API calls to the system. For example, error codes or timeout responses may indicate that a system is unavailable. In some embodiments, message queue depth indicators or message queue lag indicators may indicate the performance of data streaming connections between systems. For example, abnormal values may suggest connectivity issues or system failures. In some embodiments, circuit breaker events may be configured to trigger due to repeated failures in communication or performance benchmarks for a system. In some embodiments, the resource authorization system or stand-in engine may use one or more machine learning models or artificial intelligence-based systems to monitor one or more system status indicators (e.g., streamed system signals) to determine operational state changes.

As used herein, the term "reconciliation operation" refers to a computer-implemented process configured to update or synchronize data between two systems or services, such as updating or synchronizing the resource control system based on the proxy state log after an outage state. For example, a reconciliation operation may be performed responsive to the resource control switching from an outage state to a default operational state. In some embodiments, a reconciliation operation may include merging data from the proxy state log or immutable audit record with one or more data stores of the resource control system. For example, a reconciliation operation may include updating data stores of the resource control system based on stand-in activity recorded in the proxy state log or immutable audit record according to one or more deterministic rules using timestamp data or data version information.

In some examples, a reconciliation operation may include updating resource availability data for segregated resource entities based on resource access requests that were authorized during the stand-in operational state, adjusting resource consumption limit data to reflect resource usage, synchronizing resource hold data to ensure consistency between the proxy state log and the resource control system, clearing expired resource reservation locks based on a corresponding predetermined duration to expiration, posting confirmed resource access requests to external processing systems, generating audit records to document changes applied during the reconciliation operation, using audit records to resolve conflicts or verify changes applied during the reconciliation operation, or the like as described herein.

As used herein, the term "deterministic rules" refers to computer-implemented rules applied during reconciliation operations to configure how data from the proxy state log and data from the resource control system are merged. In some embodiments, deterministic rules may use at least one of timestamp data or data version information to establish precedence. For example, deterministic rules may establish precedence for resolving conflicts between data in the proxy state log and data of the resource control system based on when each data element was created or modified. In an example, deterministic rules may specify that more recent timestamps or higher version numbers take precedence when merging data. In some embodiments, deterministic rules may establish precedence or other configurations for handling different data types, data sources, or edge cases as they relate to reconciliation operations. For example, deterministic rules may specify how to resolve conflicts when data in the proxy state log and data in the resource control system have overlapping or inconsistent values. In some examples, deterministic rules may define how to process resource reservation locks, how resource hold data is applied to update resource availability data or resource consumption limit data, or specify ordering constraints for processing data elements during reconciliation operations to ensure that dependencies between data elements are respected and that the reconciliation operation produces consistent and predictable results.

As used herein, the term "immutable audit record" refers to data characterizing one or more computer-implemented processes or operations associated with resource access related data or resource access requests. In some examples, the immutable audit record may include, be embodied by, or otherwise associated with one or more distributed database systems, in-memory data stores, persistent storage systems or caching layers, or other data storage systems. In some embodiments, the immutable audit record may include software, hardware, or hardware with enabling software configured to receive, maintain, and facilitate access to various data. In some embodiments, the immutable audit record may share computing hardware and at least some software with one or more other systems or components of various systems described herein (e.g., the stand-in engine, the resource control system, the resource authorization system) or may utilize its own hardware or software. For example, the immutable audit record may include data characterizing activity associated with the proxy state log, the resource control system, the resource authorization system, or reconciliation operations. In some examples, the immutable audit record may include data characterizing reads or writes to the proxy state log or data stores of the resource control system or resource authorization system, decisions for processing resource access requests, or other resource access related data or activity. For example, the immutable audit record may include data characterizing resource reservation locks, updates associated with the proxy state log, operations performed by the resource authorization system during a stand-in operational state, or reconciliation operations.

In some embodiments, the immutable audit record may be configured to be tamper-evident, such that any modifications to the immutable audit record after creation can be detected (e.g., a write only record). In some embodiments, one or more systems or components thereof may be configured to write records to the immutable audit record, or the immutable audit record may be configured to receive data from systems or components thereof in association with processes or operations performed thereby. For example, the immutable audit record may log data characterizing every computer-implemented process associated with one or more operational states or the resource control system or resource authorization system. In some embodiments, the immutable audit record may include identifiers for data sources, version numbers, or timestamps for each logged instance. In some embodiments, the immutable audit record may be maintained according to enterprise or government level compliance policies or used for fraud management, operational transparency, or regulatory reporting.

As used herein, the term "batch ingestion data pipeline" refers to a computer-implemented process or system configured to receive periodic or bulk updates of data from a system. For example, a batch ingestion data pipeline may be used to receive intermittent batches of resource access related data from the resource control system. In some embodiments, a batch ingestion data pipeline may be used to transfer large volumes of data, such as segregated resource entity metadata, resource availability data, or resource consumption limit data at scheduled intervals. In some embodiments, a batch ingestion data pipeline may be used to maintain last-known available resource data for the proxy state log. In some embodiments, a batch ingestion data pipeline may be used in conjunction with a continuous streaming data pipeline. For example, a batch ingestion data pipeline may provide baseline data that is then updated in real-time by a continuous streaming data pipeline. In some embodiments, a batch ingestion data pipeline may be used to transfer data that changes infrequently, is more efficiently transferred in bulk, or is only made available periodically. In some embodiments, a batch ingestion data pipeline may be monitored using system status indicators to detect connectivity issues or system failures.

As used herein, the term "continuous streaming data pipeline" refers to a computer-implemented process or system configured to receive real-time updates of data from a system. For example, a continuous streaming data pipeline may be used to receive continuous updates of resource access related data from the resource control system. In some embodiments, a continuous streaming data pipeline may use message queuing systems, event listeners, or event streaming platforms to transmit data changes from systems as they occur. In some embodiments, a continuous streaming data pipeline may be used to maintain last-known available resource data for the proxy state log. In some embodiments, a continuous streaming data pipeline may be used in conjunction with a batch ingestion data pipeline. In some embodiments, a continuous streaming data pipeline may use partitioned event types, idempotent segregated resource entities, or data compression to maintain throughput and data consistency. For example, a continuous streaming data pipeline may be configured to handle high volumes of events while ensuring that events are processed in order and without duplication. In some embodiments, a continuous streaming data pipeline may be monitored using system status indicators to detect connectivity issues or system failures.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the terms "data structure," "data object," or "data set" refer interchangeably to data capable of being transmitted, received, and/or stored.

As used herein, the term "circuitry" refers to particular hardware configured to perform the functions associated with the particular circuitry as described herein. In some embodiments, circuitry may be used as part of (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, and/or the like. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," refers to a physical storage medium (e.g., volatile, or non-volatile memory device), and may be differentiated from a "computer-readable transmission medium," which refers to an electromagnetic signal.

As used herein, the term "machine learning model" refers to one or more processes, algorithms, and/or other data entity that describes parameters, hyper-parameters, defined operations, and/or defined mappings of a model that is configured to process one or more inputs in accordance with one or more trained parameters of the machine learning models in order to generate a prediction. An example of a machine learning model is a mathematically derived algorithm (MDA). An MDA may comprise any algorithm trained using training data to predict one or more outcome variables. Without limitation, an MDA, as used herein, may comprise machine learning frameworks including neural networks, diffusion models, generative adversarial networks, convolutional neural networks, recurrent neural networks, text-to-video models, video-to-text models, text-to-speech models, speech-to-text models, large language models (LLMs), generative pre-trained transformers (GPT), support vector machines, gradient boosts, Markov models, adaptive Bayesian techniques, and statistical models (e.g., timeseries-based forecast models such as autoregressive models, autoregressive moving average models, and/or an autoregressive integrating moving average models). Additionally, and without limitation, an MDA, as used in the singular, may include ensembles using multiple machine learning and/or statistical techniques.

The terms "database," "repository," and/or similar terms used herein may interchangeably refer to a collection of records or data that is stored in a computer-readable storage medium using one or more database types. The term "database type" may refer to a type of database, such as a hierarchical database, network database, relational database (e.g., Aurora, RDS), entity-relationship database, object database (e.g., S3), document database, semantic database, graph database, noSqL database (e.g., DynamoDB), and/or the like.

Example System Architecture

Embodiments of the present disclosure may be implemented in various ways, including as computer program products that comprise articles of manufacture, as hardware, including circuitry, configured to perform one or more functions, and/or as combinations of specific hardware and computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT or other flagship models (GPT-4o, o1, o3, or others as released) by OPENAI, a LLAMA model by META, a CLAUDE model by ANTHROPIC, a GEMINI model by GOOGLE, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as one or more methods, apparatuses, systems, computing devices (e.g., user devices, servers, etc.), computing entities, and/or the like. As such, embodiments of the present disclosure may take the form of an apparatus, system, computing device, computing entity, and/or the like executing instructions stored on one or more computer-readable storage mediums (e.g., via the aforementioned software components and computer program products) to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, and other example visualizations. It should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. In embodiments in which specific hardware is described, it is understood that such specific hardware is one example embodiment and may work in conjunction with one or more apparatuses or as a single apparatus or combination of a smaller number of apparatuses consistent with the foregoing according to the various examples described herein. Accordingly, the block diagrams and flowchart illustrations support various combinations of embodiments for performing the specified instructions, operations, or steps.

In this regard, FIG. 1 shows an example system environment 100 within which at least some embodiments of the present disclosure may operate. The depiction of the example system environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system environment 100 disclosed therein is merely presented to provide an example basis and context for the facilitation of some of the features, aspects, and uses of the methods, apparatuses, computer readable media, and computer program products disclosed and contemplated herein.

As shown in FIG. 1, the example system environment 100 includes a resource control system 102, a segregated resource entity repository 104, one or more application program interface (API) gateways 106, one or more resource access channels 108, an immutable audit record repository 110, a stand-in engine 140, and a resource authorization system 120. The resource authorization system 120 includes a resource consumption limit repository 122, a resource availability repository 124, a resource access request engine 126, an operational state controller 128, and a reconciliation engine 130. The stand-in engine 140 includes a data ingestion engine 142, a data publication service 156, a proxy state log repository 158 comprising last-known available resource data 160, an operational state controller 162, and a segregated resource entity information service 164. The data ingestion engine 142 includes a batch ingestion data pipeline 144 and a continuous streaming data pipeline 146. The batch ingestion data pipeline 144 includes a network attached storage 148 and a data file consumer 150, and the continuous streaming data pipeline 146 includes an event streaming platform 152 and streaming data consumer 154.

In some embodiments, the resource control system 102 may include one or more computing devices, servers, distributed computing clusters, or cloud-based infrastructure configured to perform one or more functionalities associated with resource access. For example, the resource control system 102 may be configured to serve as an authoritative source of resource access related data associated with one or more segregated resource entities. In some non-limiting contextual examples, the resource control system 102 may include or otherwise be associated with a core banking system, enterprise resource management platform, or central ledger system configured to maintain definitive resource availability data, resource consumption limit data, segregated resource entity metadata, or other resource access related data. In some embodiments, the resource control system 102 may expose APIs or use other interfaces (e.g., message queues, data pipelines, or other data exchange mechanisms) to facilitate access between the resource control system 102 and other computer-based entities. For example, the resource control system 102 may be configured to communicate with other components of the system environment 100 via the API gateways 106 to maintain and manage resource access related data used to process resource access requests for a plurality of segregated resource entities. Although the resource control system 102 is depicted in FIG. 1 without internal components for simplicity, it should be understood that the resource control system 102 may include various components such as one or more processors or computing devices, databases, application servers, load balancers, authentication services, or other combinations of hardware or software configured to perform the functionalities described herein.

In some embodiments, the segregated resource entity repository 104 may include one or more computing systems, databases, storage platforms, or other data management services configured to maintain information for one or more segregated resource entities. In some non-limiting contextual examples, the segregated resource entity repository 104 may be associated with a customer information management service configured to aggregate and maintain a unified view of customer account data across multiple enterprise services, products, or channels, such as deposit accounts, credit facilities, investment portfolios, or payment instruments. For example, the segregated resource entity repository 104 may include or otherwise be associated with a relational database management system, a distributed database system, a cloud-based database system, or the like configured to persist resource access related data, segregated resource entity metadata, or other data in association with various segregated resource entities. In some embodiments, the segregated resource entity repository 104 may expose one or more APIs (e.g., API gateways 106) or use other interfaces to facilitate access between the segregated resource entity repository 104 and other computer-based entities.

In some embodiments, the API gateway 106 may include one or more computing devices, servers, distributed computing clusters, or software services configured to serve as an interface for data exchange between components of the system environment 100. In some non-limiting contextual examples, an API gateway 106 may be associated with an enterprise API management platform configured to route requests, manage authentication and authorization, perform load balancing, enforce rate limiting, or provide other gateway functionalities for communications between computer-based systems. In some embodiments, an API gateway 106 may include or otherwise be associated with security measures including authentication protocols, authorization mechanisms, encryption, or access control policies configured to protect data and ensure secure communications. In some embodiments, an API gateway 106 may expose RESTful APIs, GraphQL endpoints, gRPC services, or other interface types to facilitate communications.

In some embodiments, the resource access channel 108 may include one or more communication networks, message routing systems, computing devices, or data exchange mechanisms configured to facilitate the flow of resource access requests and related data between various computer-based entities. In some non-limiting contextual examples, the resource access channel 108 may include or otherwise be associated with message queuing systems (e.g., Apache Kafka) or a combination of networking infrastructure configured to receive and route resource access requests or resources to or from various sources. For example, the resource access channels 108 may include or otherwise be associated with one or more payment rails or communication protocols, including real-time payment networks (e.g., RTP, FedNow), wire transfer systems, internal transfer mechanisms, or other channels through which resource access requests may be received. In some embodiments, a resource access channel 108 may expose one or more APIs (e.g., API gateways 106) or use other interfaces to facilitate access between the resource access channel 108 and other computer-based entities.

In some embodiments, the immutable audit record repository 110 may include one or more computing systems, databases, storage platforms, or other data management services configured to maintain an immutable audit record. In some non-limiting contextual examples, the immutable audit record repository 110 may include or otherwise be associated with an append-only database, a distributed ledger system, a write-once storage platform, or a dedicated audit logging service configured to store records for resource access related activity performed by or in association with one or more components of the system environment 100. For example, the immutable audit record repository 110 may include a cloud-based infrastructure or dedicated servers configured to store data characterizing activity associated with the proxy state log, computer-based entities configured to process or handle resource access requests, or reconciliation operations (e.g., reads and writes for the proxy state log, updates to last-known available resource data, authorization decisions during stand-in operational states, resource reservation locks, or merges between the proxy state log and data stores of the resource control system 102). In some embodiments, the immutable audit record repository 110 may include identifiers for data sources, version numbers, or timestamps for each logged instance and may be maintained according to enterprise or government level compliance policies. In some embodiments, the immutable audit record repository 110 may expose one or more APIs (e.g., API gateways 106) or use other interfaces to facilitate access between the immutable audit record repository 110 and other computer-based entities.

In some embodiments, the resource authorization system 120 may include one or more computing devices, servers, distributed computing clusters, or cloud-based infrastructure configured to perform one or more functionalities associated with resource access. For example, the resource authorization system 120 may be configured to serve as an authorization service for determining whether to approve or deny resource access requests. In some embodiments, the resource authorization system 120 may be configured to use data from the resource control system 102 or the proxy state log repository 158 to facilitate various functionalities. In some non-limiting contextual examples, the resource authorization system 120 may include or otherwise be associated with a payment authorization service, balance control system, or resource access request processing platform configured to authorize or deny resource access requests based on resource access related data. For example, the resource consumption limit repository 122, resource availability repository 124, resource access request engine 126, operational state controller 128, and reconciliation engine 130 may facilitate resource access request processing, operational state management, or reconciliation operations. In some embodiments, the resource authorization system 120 may expose one or more APIs (e.g., API gateways 106) or use other interfaces (e.g., message queues, data pipelines, or other data exchange mechanisms) to facilitate access between the resource authorization system 120 and other computer-based entities.

In some embodiments, the stand-in engine 140 may include one or more computing devices, servers, distributed computing clusters, or software services configured to maintain the proxy state log repository 158. In some embodiments, the stand-in engine 140 may facilitate operational continuity for the resource authorization system 120 during outage states of the resource control system 102. In some non-limiting contextual examples, the stand-in engine 140 may include or otherwise be associated with a data replication service, caching layer, or stand-in data management platform configured to continuously ingest data from the resource control system 102 and maintain last-known available resource data 160 for use during stand-in operational states. In some embodiments, the data ingestion engine 142, data publication service 156, proxy state log repository 158, and operational state controller 162, may be configured to facilitate data ingestion, data distribution, proxy state maintenance, operational state coordination, or other functionalities of the stand-in engine 140. In some embodiments, the stand-in engine 140 may expose one or more APIs (e.g., API gateways 106) or use other interfaces (e.g., the data ingestion engine 142) to facilitate access between the stand-in engine 140 and other computer-based entities. For example, the data ingestion engine 142 may receive data from the resource control system 102 via the batch ingestion data pipeline 144 or the continuous streaming data pipeline 146.

It will be understood that while many of the aspects and components presented in FIG. 1 are shown as discrete, separate elements, other configurations may be used in connection with the methods, apparatuses, computer readable media, and computer programs described herein, including configurations that combine, omit, separate, and/or add aspects and/or components. The various functions described with reference to the system environment 100 may be performed by other arrangements of one or more computing devices and/or computing systems without departing from the scope of the present disclosure. In some embodiments, a computing system may comprise one or more computing devices (e.g., server(s)). For example, in some embodiments, the functions of one or more of the illustrated components in FIG. 1 may be performed by a single computing device or by multiple computing devices, which devices may be local or cloud based. It will be appreciated that the various functions performed by one or more of the resource control system 102, segregated resource entity repository 104, API gateways 106, resource access channels 108, immutable audit record repository 110, resource authorization system 120, stand-in engine 140, or any components thereof, may be embodied by a single apparatus, subsystem, or system comprising one or more sets of computing hardware (e.g., processor(s) and memory) configured to perform various functions thereof.

It will be appreciated that the various functions performed by two or more components of the system environment 100 may be performed by a single apparatus, subsystem, or system. For example, two or more of the resource consumption limit repository 122, resource availability repository 124, resource access request engine 126, operational state controller 128, reconciliation engine 130, data ingestion engine 142, data publication service 156, proxy state log repository 158, operational state controller 162, or segregated resource entity information service 164 may be embodied by a single apparatus, subsystem, or system comprising one or more sets of computing hardware (e.g., processor(s) and memory) configured to perform various functions thereof.

In some embodiments, the resource authorization system 120 and the stand-in engine 140 may be implemented as separate systems with distinct hardware and software components. In some embodiments, the resource authorization system 120 and the stand-in engine 140 may be implemented as combined systems with at least one shared hardware or software component. In an embodiment, the stand-in engine 140 may be a component of the resource authorization system 120. For example, the stand-in engine 140 may be implemented as a software module, library, or subsystem within the resource authorization system 120. In some embodiments, the resource authorization system 120 and the stand-in engine 140 may share one or more components. For example, the operational state controller 128 of the resource authorization system 120 and the operational state controller 162 of the stand-in engine 140 may be the same controller comprising the same hardware or software. Accordingly, some functionalities attributed to the resource authorization system 120 or the stand-in engine 140 may be attributable to either or both in various embodiments.

In some embodiments, two or more components of the system environment 100 may be deployed across one or more computing devices, including servers, distributed computing clusters, or cloud-based infrastructure. For example, the resource authorization system 120 and the stand-in engine 140 may each be deployed on separate server infrastructure or may share computing hardware in various configurations. In some embodiments, the segregated resource entity repository 104, the immutable audit record repository 110, the proxy state log repository 158, or other data stores may be implemented using distributed database systems, in-memory data stores, or other storage technologies. In some embodiments, the API gateways 106 and the resource access channels 108 may be implemented using various networking technologies, load balancers, or message routing systems to facilitate communication between components of the system environment 100.

The various components illustrated in the system 100 may be configured to communicate via one or more communication mechanisms, including wired or wireless connections, such as over a network, bus, or similar connection. For example, such a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, such a network may include a cellular telephone, an 802.11, 802.16, 802.20, and/or WiMAX network. Further, such a network may include a public network, such as the Internet, a private network, such as an intranet, or combinations thereof, and may utilize a variety of networking protocols now available or later developed including, but not limited to TCP/IP based networking protocols.

Accordingly, in various embodiments, the components depicted in FIG. 1 as being included in the system environment 100, although not required to be an integral system, may be connected via one or more networks. In some embodiments, one or more APIs (e.g., API gateways 106) may be leveraged to communicate with and/or facilitate communication between one or more of the components illustrated in the system environment 100.

Example System Operations

In some embodiments, the resource control system 102 may be configured to serve as an authoritative source of resource access related data for a plurality of segregated resource entities. For example, the resource control system 102 may maintain resource availability data, resource consumption limit data, segregated resource entity metadata, resource access request metadata, auditing data, or other resource access related data used to maintain resources. For example, the resource control system 102 may include or otherwise be associated with a core banking system or another enterprise resource management platform. In some embodiments, the resource control system 102 may provide data to the resource authorization system 120 to facilitate one or more functionalities of the resource authorization system 120 (e.g., processing resource access requests).

For example, when a resource access request is initiated via a resource access channel 108, the resource authorization system 120 may query the resource control system 102 for resource access related data or segregated resource entity metadata used to authorize or otherwise process the resource access request (e.g., perform balance checks, retrieve account metadata, retrieve restraint information, facilitate specific customer treatments, or maintain daily overdraft entitlements). In some embodiments, a resource access channel 108 may route a resource access request or associated information to the resource control system 102 or query the resource control system 102 for operational status information to determine whether resource access requests may be processed. In some embodiments, the resource control system 102 may receive inquiries regarding resource availability for a segregated resource entity and may respond with current resource availability data, resource consumption limit data, or other resource access related data maintained by the resource control system 102.

In some embodiments, the resource control system 102 may publish data for ingestion by the stand-in engine 140 (e.g., via the data ingestion engine 142). For example, the resource control system 102 may transmit resource access related data through the batch ingestion data pipeline 144 or the continuous streaming data pipeline 146 so that the stand-in engine 140 may maintain the last-known available resource data 160 in the proxy state log repository 158. In some embodiments, the resource control system 102 may generate events or data updates that are consumed by the event streaming platform 152 of the continuous streaming data pipeline 146, enabling real-time synchronization of resource access related data with the proxy state log repository 158. In some embodiments, the resource control system 102 may generate data files or batch exports that are stored in the network attached storage 148 of the batch ingestion data pipeline 144, enabling periodic synchronization of resource access related data with the proxy state log repository 158.

In some embodiments, the resource control system 102 may interact with the segregated resource entity repository 104 to maintain and update segregated resource entity metadata, resource availability data, or other resource access related data. For example, the resource control system 102 may write updates to the segregated resource entity repository 104 when resource access requests are settled, when resource allocations change, or when segregated resource entity configurations are modified. In another example, the resource control system 102 may read from the segregated resource entity repository 104 to retrieve current data for processing resource access requests or responding to inquiries from other systems.

In some embodiments, the resource control system 102 may provide data to the immutable audit record repository 110 to maintain records of resource access related activity. For example, the resource control system 102 may log data characterizing resource access requests processed, authorization decisions made, resource availability changes, reconciliation operations performed, or other operations performed by or in association with the resource control system 102. In some embodiments, the resource control system 102 may receive data from the immutable audit record repository 110 during reconciliation operations or auditing processes to verify the integrity of resource access related data or to reconcile conflicts regarding the history of resource access activity.

In some embodiments, the resource control system 102 may be associated with an operational state characterizing availability or performance of the resource control system 102. For example, the resource control system 102 may be in a default operational state or an outage state. In some embodiments, an outage state of the resource control system 102 may be a planned outage state associated with scheduled maintenance activities or an unplanned outage state identified by monitoring one or more system status indicators. In some embodiments, the resource control system 102 may provide alerts or other indications of an operational state change to the resource authorization system 120 or the stand-in engine 140 (e.g., via the operational state controller 128 or operational state controller 162, respectively).

For example, the resource control system 102 may provide an indication of a planned outage state such as a particular time window during which the resource control system is planned to be in an outage state. In another example, the resource control system 102 may internally detect an outage state and, in response, provide an indication to the resource authorization system 120 or stand-in engine 140. In yet another example, the resource control system 102 may provide an indication that the resource control system has returned to a default operational state following an outage state. In some embodiments, responsive to the resource control system 102 switching from an outage state to a default operational state, the resource control system 102 may receive data from the proxy state log repository 158 (e.g., directly or indirectly, for example, via the reconciliation engine 130) in association with a reconciliation operation to bring the resource control system 102 up to date with data maintained during the outage state.

In some embodiments, the resource authorization system 120 may be configured to perform authorization decisions for resource access requests using data maintained by the resource control system 102. When the resource control system 102 switches to an outage state, the resource authorization system 120 may be configured to switch to a stand-in operational state in which the resource authorization system uses data maintained by the proxy state log of the proxy state log repository 158 (e.g., the last-known available resource data 160). In some embodiments, the resource authorization system 120 may directly invoke the stand-in engine 140 to facilitate stand-in operations. For example, the resource authorization system 120 may determine the resource control system 102 is in an outage state and, in response, orchestrate a transition to the stand-in operational state in which the resource authorization system 120 may begin using the stand-in engine 140 to maintain operational continuity, such as by processing resource access requests using data from the proxy state log repository 158.

In some embodiments, the resource consumption limit repository 122 may be configured to maintain resource consumption limit data associated with one or more segregated resource entities. For example, the resource consumption limit repository 122 may store data indicating thresholds configured to govern access to resources for segregated resource entities, such as daily consumption limits, transaction frequency limits, or channel-specific limits. In some embodiments, the resource consumption limit repository 122 may receive resource consumption limit data from the resource control system 102 during a default operational state and may receive resource consumption limit data from the proxy state log repository 158 during a stand-in operational state. In some embodiments, the resource consumption limit repository 122 may be queried by the resource access request engine 126 to process resource access requests to determine whether a resource access request satisfies applicable resource consumption limits.

In some embodiments, the resource availability repository 124 may be configured to maintain resource availability data associated with one or more segregated resource entities. For example, the resource availability repository 124 may store data indicating measures of resources associated with segregated resource entities, such as one or more resource availability categories indicating amounts of resources allocated or available to particular segregated resource entities. In some embodiments, the resource availability repository 124 may maintain a plurality of resource availability categories for each segregated resource entity corresponding to different types of measures of a resource. In some embodiments, the resource availability repository 124 may receive resource availability data from the resource control system 102 during a default operational state and may receive resource availability data from the proxy state log repository 158 during a stand-in operational state. In some embodiments, the resource availability repository 124 may be queried by the resource access request engine 126 to process resource access requests to determine whether sufficient resources are available.

In some embodiments, the resource access request engine 126 may be configured to process resource access requests. For example, the resource access request engine 126 may be configured to authorize or deny resource access requests based on resource access related data maintained by the resource consumption limit repository 122, the resource availability repository 124, or otherwise received from the resource control system 102 or the proxy state log repository 158. In some embodiments, the resource access request engine 126 may query the resource control system 102 during a default operational state or query the proxy state log repository 158 during a stand-in operational state. In some embodiments, the resource access request engine 126 may process resource access requests based on segregated resource entity metadata or other authorization information (e.g., customer credentials, requester authorization information, etc.) received in association with a resource access request or queried from the resource control system 102, segregated resource entity repository 104, stand-in engine 140 (e.g., segregated resource entity information service 164), or other sources.

In some embodiments, the resource access request engine 126 may be configured to place a processing lock on a segregated resource entity associated with a resource access request to enforce sequential processing of resource access requests during the stand-in operational state. For example, the resource access request engine 126 may acquire a processing lock for a segregated resource entity, process the resource access request, update the proxy state log repository 158 or immutable audit record repository 110, and release the processing lock before processing a subsequent resource access request for the same segregated resource entity. In some embodiments, the resource access request engine 126 may be configured to generate resource reservation locks characterizing resource access requests to track provisional changes to the last-known available resource data 160 when resource access requests are authorized during the stand-in operational state. In some embodiments, the resource access request engine 126 may be configured to update resource hold data of the proxy state log based on authorized resource access requests. For example, the resource access request engine 126 may increase or decrease a resource availability value or a resource consumption limit associated with a segregated resource entity to reflect the manipulation of resources caused by an authorized resource access request.

In some embodiments, the resource access request engine 126 may determine whether to authorize or deny a resource access request by comparing the resource access request against at least one of a resource availability value, a resource consumption limit, or resource hold data for the associated segregated resource entity. For example, the resource access request engine 126 may retrieve resource availability data and resource consumption limit data associated with a segregated resource access entity and evaluate whether the resource access request satisfies applicable thresholds and limits. In some embodiments, the resource access request engine 126 may select a resource availability category from among a plurality of resource availability categories based on a resource availability-state hierarchy.

In some embodiments, the operational state controller 128 or operational state controller 162 may be configured to monitor or manage operational state changes associated with the resource control system 102 or the resource authorization system 120. For example, the operational state controller 128 may be configured to monitor one or more system status indicators associated with the resource control system 102 to detect operational state changes of the resource control system 102. In some embodiments, the operational state controller 128 may receive indications of operational state changes from the resource control system 102. In some embodiments, the operational state controller 128 may be configured to switch the resource authorization system 120 between a default operational state and a stand-in operational state. For example, responsive to detecting that the resource control system 102 has switched to an outage state, the operational state controller 128 may switch the resource authorization system 120 to a stand-in operational state in which the resource authorization system 120 uses data from the proxy state log repository 158 without synchronizing with the resource control system 102. In another example, responsive to detecting that the resource control system 102 has returned to a default operational state, the operational state controller 128 may switch the resource authorization system 120 to a default operational state in which the resource authorization system 120 uses data from the resource control system 102.

In some embodiments, the operational state controller 128 may coordinate with the operational state controller 162 of the stand-in engine 140 to monitor operational state changes of the resource control system 102 or to manage operational state transitions for the resource authorization system 120 or stand-in engine 140. For example, the operational state controller 128 and the operational state controller 162 may exchange signals or messages to synchronize operational state changes between the resource authorization system 120 and the stand-in engine 140. In some embodiments, the operational state controller 128 may trigger the reconciliation engine 130 to perform reconciliation operations responsive to the resource control system 102 returning to a default operational state.

In some embodiments, the reconciliation engine 130 may be configured to perform reconciliation operations to update the resource control system 102 based on the proxy state log repository 158. For example, the reconciliation engine 130 may be configured to merge data from the proxy state log repository 158 and data from the immutable audit record repository 110 with one or more data stores of the resource control system 102. In some embodiments, the reconciliation engine 130 may apply deterministic rules using timestamp data or data version information to establish precedence when merging data.

In some embodiments, the reconciliation engine 130 may be configured to clear expired resource reservation locks based on a corresponding predetermined duration to expiration. For example, during a reconciliation operation, the reconciliation engine 130 may identify resource reservation locks that have exceeded their predetermined duration to expiration and remove such expired resource reservation locks from the proxy state log repository 158 or associated data stores. In some embodiments, the reconciliation engine 130 may be configured to update resource availability data for segregated resource entities based on resource access requests that were authorized during the stand-in operational state, adjust resource consumption limit data to reflect resource usage, synchronize resource hold data to ensure consistency between the proxy state log repository 158 and the resource control system 102, or store audit records (e.g., via the immutable audit record repository 110) to document changes applied during the reconciliation operation.

In some embodiments, the stand-in engine 140 may be configured to maintain the proxy state log repository 158 comprising the proxy state log and last-known available resource data 160 using data received from the resource control system 102 via the data ingestion engine 142. The data ingestion engine 142 includes the batch ingestion data pipeline 144 and the continuous streaming data pipeline 146 configured to collectively facilitate receiving data from the resource control system 102 so that the proxy state log repository 158 contains current data that can be used by the resource authorization system 120 during a stand-in operational state. In some embodiments, the stand-in engine 140 may be configured to provide or otherwise make available the last-known available resource data 160 from the proxy state log repository 158 to the resource authorization system 120 during a stand-in operational state.

In some embodiments, the batch ingestion data pipeline 144 may receive periodic bulk updates from the network attached storage 148. For example, the network attached storage 148 may store data files generated by the resource control system 102 at scheduled intervals, and the data file consumer 150 may retrieve and process such data files to update the proxy state log repository 158. In some embodiments, the data file consumer 150 may parse, validate, or transform data from the network attached storage 148 before writing the data to the proxy state log repository 158.

In some embodiments, the continuous streaming data pipeline 146 may receive real-time event updates via the event streaming platform 152. For example, the continuous streaming data pipeline 146 may use Change Data Capture (CDC) to capture real-time updates for balances, restraints, or account events from the resource control system 102. For example, the event streaming platform 152 may receive CDC events generated by the resource control system 102 when resource access related data changes, and the streaming data consumer 154 may process such events to update the proxy state log repository 158 in real-time.

In some embodiments, the data ingestion engine 142 may use partitioned event topics with idempotent consumers to maintain data consistency and throughput during ingestion into the proxy state log repository 158. For example, the event streaming platform 152 may organize events into partitioned topics based on segregated resource entity identifiers, and the streaming data consumer 154 may process events from each partition using idempotent processing logic to prevent duplicate updates to the proxy state log repository 158. In some embodiments, the data ingestion engine 142 may implement skew-management strategies and history compaction to maintain throughput and efficiency when processing high volumes of events. For example, the data ingestion engine 142 may detect and correct temporal skew between events from different partitions and may compact historical event data to reduce storage requirements while preserving the most recent state.

In some embodiments, the data ingestion engine 142 may maintain ordering and consistency through lineage identifiers, version numbers, and out-of-order correction mechanisms. For example, each event received by the data ingestion engine 142 may include a lineage identifier and a version number that the data ingestion engine 142 uses to determine the correct ordering of events and to detect when events arrive out of order. In some embodiments, the data ingestion engine 142 may buffer out-of-order events and reorder such events before applying updates to the proxy state log repository 158, or may apply correction logic to reconcile out-of-order updates with previously applied updates.

In some embodiments, the data publication service 156 may be configured to manage the distribution of data to other systems (e.g., the resource authorization system 120, the segregated resource entity repository 104, or the immutable audit record repository 110) or within the stand-in engine 140. For example, the data publication service 156 may aggregate updates from the data ingestion engine 142 or the proxy state log repository 158 and provide such updates to an external computer-based system. In some embodiments, the data publication service 156 may provide interfaces (e.g., API gateways 106) to access data from the proxy state log repository 158.

In some embodiments, the proxy state log repository 158 may store the last-known available resource data 160 comprising the most recent resource access related data received from the resource control system 102. For example, the proxy state log repository 158 may maintain resource availability data, resource consumption limit data, segregated resource entity metadata, resource hold data, or other resource access related data associated with one or more segregated resource entities. In some embodiments, the proxy state log repository 158 may be implemented using distributed database systems, in-memory data stores, or other storage technologies configured to support high-throughput reads and writes during stand-in operational states.

In some embodiments, the operational state controller 162 may be configured to monitor operational state changes of the resource control system 102, manage operational state changes for the stand-in engine 140 or resource authorization system 120, or coordinate with the operational state controller 128. For example, the operational state controller 162 may monitor the availability of the resource control system 102 and trigger state changes that cause the resource authorization system 120 and stand-in engine 140 to transition between default and stand-in operational states. In some embodiments, the operational state controller 162 may signal the data ingestion engine 142 to continue or pause ingestion activities based on the operational state of the resource control system 102. In some embodiments, the operational state controller 162 may coordinate with the operational state controller 128 to ensure that the resource authorization system 120 and the stand-in engine 140 transition between operational states in a synchronized manner.

In some embodiments, during a default operational state, when a resource access request is initiated by a resource access channel 108, the resource authorization system 120 may query the resource control system 102 via the API gateway 106 to retrieve current resource availability data, resource consumption limit data, or segregated resource entity metadata associated with the resource access request. The resource authorization system 120 may use the data received from the resource control system 102 to determine whether to authorize or deny the resource access request. Additionally, the stand-in engine 140 may continuously update the proxy state log repository 158 with data received from the resource control system 102 to maintain stand-in readiness and the resource authorization system 120 may synchronize with the resource control system 102 to receive resource access related data as resource access requests are processed.

In some embodiments, during a stand-in operational state, when a resource access request is initiated by the resource access channel 108, the resource authorization system 120 may retrieve resource access related data from the proxy state log repository 158 without synchronizing with the resource control system 102. The resource authorization system 120 may place a processing lock on a segregated resource entity associated with the resource access request and determine whether to authorize or deny the resource access request using last-known available resource data 160 and resource hold data maintained by the proxy state log repository 158. Additionally, the resource authorization system 120 may update the proxy state log repository 158 based on the authorization decision and may generate a resource reservation lock characterizing a provisional change to the last-known available resource data 160.

In some embodiments, responsive to the resource control system 102 returning to a default operational state, the reconciliation engine 130 may perform a reconciliation operation to update the resource control system 102 based on the proxy state log repository 158. The reconciliation engine 130 may merge data from the proxy state log repository 158 and data from the immutable audit record repository 110 with one or more data stores of the resource control system 102. Additionally, the reconciliation engine 130 may clear expired resource reservation locks based on a corresponding predetermined duration to expiration and may apply deterministic rules using timestamp data or data version information to establish precedence when merging data.

In some embodiments, resource access requests and resource access related data may be structured as data objects exchanged between components of the system environment 100. The following non-limiting contextual examples illustrate some example data structures that may be used in association with processing resource access requests and maintaining the proxy state log.

In some embodiments, a resource access request may be structured as a data object comprising fields that identify the segregated resource entity, the requested resource amount, and other parameters used to process the request. For example, a resource access request data object may include a segregated resource entity identifier (e.g., an account number field), a resource amount field indicating the amount of resources requested, a product code field indicating a type of segregated resource entity, a reference identifier field for tracking the request, a processing system field indicating the resource access channel from which the request originated, or the like. The following is an example resource access request data object:

{"validatePaymentAuthorization": {"companyID": "123", "ddaAccountNumber": "157515061555", "productCode": "DDA", "paymentAmount": "20", "paymentReferenceNumber": "RAS_REF_111101{{$guid}}", "processingSystem": "PAYMENT_CHANNEL_01" }}

In some embodiments, a resource access response may be structured as a data object comprising fields that indicate the authorization decision and related data. For example, a resource access response data object may include an authorization balance field indicating the resource availability value used for the authorization decision, an authorization indicator field indicating whether the request was authorized, block indicator fields indicating whether any restrictions apply to the segregated resource entity, reference identifier fields for tracking the request, or the like. The following is an example resource access response data object:

{"authorizationDetails": {"authorizationBalance": 4420.59, "isBalanceAuthorized": true, "isCreditBlockApplied": false, "isDebitBlockApplied": false, "paymentInstructionId": "32033290108862555", "paymentReferenceNumber": "RAS_REF_111101fba67350-5511-4dfe-8aeb-08fd94de4054" }}

In some embodiments, the continuous streaming data pipeline 146 may receive resource availability data updates via event data objects. For example, an event data object received via the event streaming platform 152 may include event information fields comprising resource availability values and segregated resource entity metadata, and event metadata fields comprising timestamp data, version information, and partition identifiers used for ordering and consistency, or the like. The following is an example event data object:

{"eventInformation": {"dataFields": [{"name1": "accountNumber", "value1": "000000000001301035-50555" }, {"name1": "masterAccountNumber", "value1": " " }, {"name1": "goodFundBalance", "value1": 13400.37}, {"name1": "availableBalance", "value1": 13400.37}, {"name1": "companyId", "value1": "00815" }, {"name1": "masterCompanyId", "value1": "00000" }, {"name1": "productCode", "value1": "DDA" }, {"name1": "masterProductCode", "value1": " " }, {"name1": "masterType", "value1": " " }]}, "eventMetadata": {"channel": "RCS", "datasetName": "Account-Balance-Detail", "datasetVersion": "vi", "eventOccurredTimestamp": "2025-05-21T19:55:59.597000Z", "eventOriginationType": "RT", "eventPublishedTimestamp": "2025-05-21T19:55:59.597000Z", "operationType": "Update", "partitionBy": "00815DDA000000000001301035505555" }, "meta_data": [{"name": "JMS_PAYLOAD", "type": null, "value": "00632INTRA55227NACURTI DDA ESDOB600 B6DORCSX55625 N 6348 12505210145559IDSDD$0 NYYNYN2.0 F14555959N 00844Account-Balance-Detail viRCS Update00815DDA000000000001301035505555 2025-05-21T19:55:59.597000Z 2025-05-21T19:55:59.597000Z 00000000000130103550555500815 DDA 0000000013400.37 0000000013400.37 00000"}]}

Example Devices

Having discussed example systems in accordance with the present disclosure, example devices (also sometimes referred to herein as "apparatuses") in accordance with the present disclosure will now be described.

Figure 2:
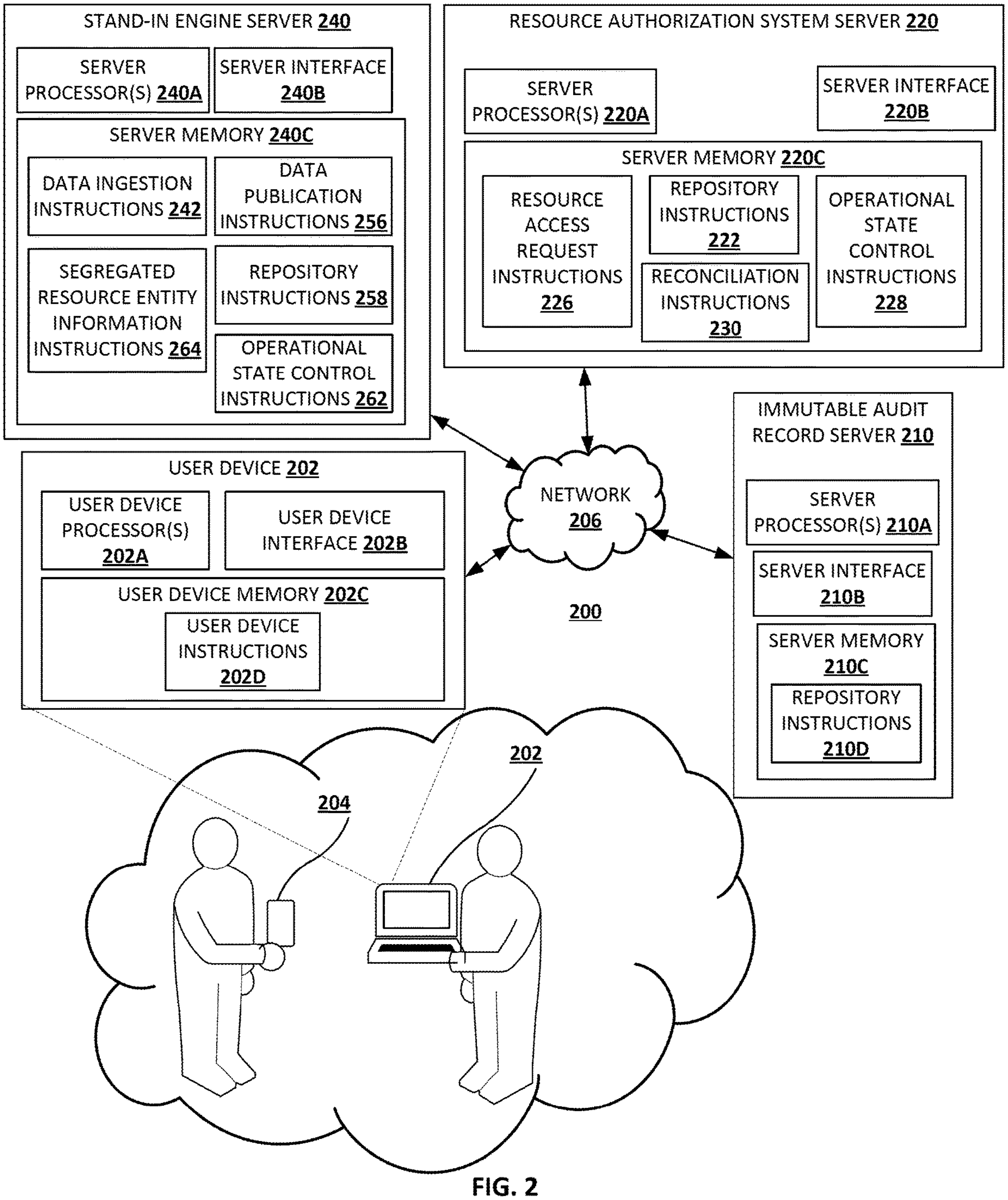
FIG. 2 illustrates a system that may be specifically configured in accordance with various embodiments of the present disclosure and within which at least some embodiments of the present disclosure may operate.

FIG. 2 illustrates a system 200 configured to process resource access requests and maintain operational continuity during outage states of the resource control system. The system 200 includes a user device 202, a user device 204, an immutable audit record server 210, a resource authorization system server 220, and a stand-in engine server 240 connected to a network 206.

The user device 202 is a device used by a user that can be used as part of processes described herein. The user device 202 can include one or more aspects described elsewhere herein such as in reference to the computing environment 1100 of FIG. 11. In many examples, the user device 202 is a personal computing device, such as a smart phone, tablet, laptop computer, or desktop computer. But the user device 202 need not be so limited and may instead encompass other devices used by a user as part of processes described herein (e.g., a point of sale terminal, payment processor, enterprise terminal, desktop, laptop, kiosk, etc.). In the illustrated example, the user device 202 can include a user device processor set 202A, a user device interface set 202B, and a user device memory set 202C, among other components.

The user device processor set 202A is a set of one or more processors. One or more processors are components of the user device 202 that execute instructions, such as instructions that obtain data, process the data, and provide output based on the processing (e.g., instructions stored within the user device memory 202C such as user device instructions 202D). The user device processor set 202A can include one or more aspects described below in relation to the processor set 1112 of FIG. 11.

The user device interface 202B is a set of one or more interfaces, which are one or more components of the user device 202 that facilitate receiving input from and providing output to something external to the user device 202. The user device interface 202B can include one or more aspects described below in relation to the interfaces 1118 of FIG. 11.

The user device memory set 202C is a set of one or more memory components, which are components of the user device 202 configured to store instructions and data for later retrieval and use. The user device memory set 202C can include one or more aspects described below in relation to the memory 1114 of FIG. 11. As illustrated, the user device memory set 202C stores user device instructions 202D.

The user device instructions 202D are a set of instructions that, when executed by the user device processor set 202A, cause the user device processor set 202A to perform an operation described herein. In examples, the user device instructions 202D can be those of a mobile application (e.g., that may be obtained from a mobile application store, such as the APPLE APP STORE or the GOOGLE PLAY STORE). The mobile application can provide a user interface for receiving user input from a user and acting in response thereto. The user interface can further provide output to the user. In some examples, the user device instructions 202D are instructions that cause a web browser of the user device 202 to render a web page associated with a process described herein. The web page may present information to the user and be configured to receive input from the user and take actions in response thereto.

The user device 204 is another user device of another user. Similar to the user device 202, the user device 204 may include a processor set of one or more components of the user device 204 that execute instructions, such as instructions that obtain data, process the data, and provide output based on the processing. The processor set of device 204 can include one or more aspects described below in relation to the processor set 612 of FIG. 6.

The user device 204 can include a memory set of one or more components of the user device 204 configured to store instructions and data for later retrieval and use. The memory set of user device 204 can include one or more aspects described below in relation to the memory 1114 of FIG. 11. The memory set of user device 204 can store user device instructions.

The user device instructions of user device 204 may be a set of instructions that, when executed by the processor set of the user device 204, cause the processor set to perform one or more operations described elsewhere herein.

The user device 204 may include a user device interface set of one or more components of the user device 204 that facilitate receiving input from and providing output to something external to the user device 204.

In an example, the user device 202 and user device 204 may facilitate different aspects of processes described herein respective to different users. In various embodiments, any number of user devices such as the user device 202 or the user device 204 may be used to perform processes described herein.

In an example, the user device 202 may be used by a user to initiate a resource access request via a resource access channel (e.g., resource access channels 108), such as by submitting a payment authorization request through an online banking application. In another example, the user device 202 may be used by a user to initiate a resource access request that involves a transfer of resources to a segregated resource entity associated with the user of the user device 204. For example, the user may use the user device 202 to submit a funds transfer request directed to an account controlled by the user operating the user device 204. In yet another example, the user device 204 may be used by a user, such as an administrator or software developer, to access user interfaces configured to manage the resource authorization system 120 or the stand-in engine 140 for managing one or more functionalities thereof. For example, the user may use the user device 204 to configure certain operational state indicators used to monitor operational state changes, configure resource consumption limits for segregated resource entities, review immutable audit records of activity during a stand-in operational state, or configure resource availability-state hierarchies or deterministic rules.

The immutable audit record server 210 is a server device that functions as part of one or more processes described herein. In the illustrated example, the immutable audit record server 210 includes a server processor set 210A, a server interface set 210B, and a server memory set 210C, among other components.

The server processor set 210A is a set of one or more processors that are components of the immutable audit record server 210 that execute instructions, such as instructions that obtain data, process the data, and provide output based on the processing. The server processor set 210A can include one or more aspects described below in relation to the processor set 1112 of FIG. 11.

The server interface set 210B is a set of one or more components of the immutable audit record server 210 that facilitate receiving input from and providing output to something external to the immutable audit record server 210. The server interface set 210B can include one or more aspects described below in relation to the one or more interfaces 1118 of FIG. 11.

The server memory set 210C is a collection of one or more components of the immutable audit record server 210 configured to store instructions and data for later retrieval and use. The server memory set 210C can include one or more aspects described below in relation to the memory 1114 of FIG. 11. The server memory 210C can store repository instructions 210D, among other instructions.

The instructions of server memory set 210C are instructions that, when executed by one or more processors of the processor set 210A, cause the processor set 210A to perform one or more operations described elsewhere herein. In some embodiments, the repository instructions 210D, when executed by one or more processors of the processor set 210A, may cause the immutable audit record server 210 to perform processes described herein, including processes associated with the immutable audit record repository 110 or other components.

The resource authorization system server 220 is a server device that functions as part of one or more processes described herein. In the illustrated example, the resource authorization system server 220 includes a server processor set 220A, a server interface set 220B, and a server memory set 220C, among other components.

The server processor set 220A is a set of one or more processors that are components of the resource authorization system server 220 that execute instructions, such as instructions that obtain data, process the data, and provide output based on the processing. The server processor set 220A can include one or more aspects described below in relation to the processor set 1112 of FIG. 11.

The server interface set 220B is a set of one or more components of the resource authorization system server 220 that facilitate receiving input from and providing output to something external to the resource authorization system server 220. The server interface set 220B can include one or more aspects described below in relation to the one or more interfaces 1118 of FIG. 11.

The server memory set 220C is a collection of one or more components of the resource authorization system server 220 configured to store instructions and data for later retrieval and use. The server memory set 220C can include one or more aspects described below in relation to the memory 1114 of FIG. 11. The server memory 220C can store repository instructions 222, resource access request instructions 226, operational state control instructions 228, or reconciliation instructions 230, among other instructions.

The instructions of server memory set 220C are instructions that, when executed by one or more processors of the server processor set 220A, cause the server processor set 220A to perform one or more operations described elsewhere herein. In some embodiments, the repository instructions 222, when executed by one or more processors of the server processor set 220A, may cause the resource authorization system server 220 to perform processes described herein, including processes associated with the resource authorization system 120 or other components.

In some embodiments, the repository instructions 222, when executed by one or more processors of the server processor set 220A, may cause the resource authorization system server 220 to perform processes described herein, including processes associated with the resource authorization system 120, such as those performed by the resource consumption limit repository 122, resource availability repository 124, or other components.

In some embodiments, the resource access request instructions 226, when executed by one or more processors of the server processor set 220A, may cause the resource authorization system server 220 to perform processes described herein, including processes associated with the resource authorization system 120, such as those performed by the resource access request engine 126 or other components.

In some embodiments, the operational state control instructions 228, when executed by one or more processors of the server processor set 220A, may cause the resource authorization system server 220 to perform processes described herein, including processes associated with the resource authorization system 120, such as those performed by the operational state controller 128 or other components.

In some embodiments, the reconciliation instructions 230, when executed by one or more processors of the server processor set 220A, may cause the resource authorization system server 220 to perform processes described herein, including processes associated with the resource authorization system 120, such as those performed by the reconciliation engine 130 or other components.

The stand-in engine server 240 is a server device that functions as part of one or more processes described herein. In the illustrated example, the stand-in engine server 240 includes a server processor set 240A, a server interface set 240B, and a server memory set 240C, among other components.

The server processor set 240A is a set of one or more processors that are components of the stand-in engine server 240 that execute instructions, such as instructions that obtain data, process the data, and provide output based on the processing. The server processor set 240A can include one or more aspects described below in relation to the processor set 1112 of FIG. 11.

The server interface set 240B is a set of one or more components of the stand-in engine server 240 that facilitate receiving input from and providing output to something external to the stand-in engine server 240. The server interface set 240B can include one or more aspects described below in relation to the one or more interfaces 1118 of FIG. 11.

The server memory set 240C is a collection of one or more components of the stand-in engine server 240 configured to store instructions and data for later retrieval and use. The server memory set 240C can include one or more aspects described below in relation to the memory 1114 of FIG. 11. The server memory set 240C can store data ingestion instructions 242, data publication instructions 256, repository instructions 258, operational state control instructions 262, or segregated resource entity information instructions 264, among other instructions.

The instructions of server memory set 240C are instructions that, when executed by one or more processors of the server processor set 240A, cause the server processor set 240A to perform one or more operations described elsewhere herein. In some embodiments, the data ingestion instructions 242, when executed by one or more processors of the server processor set 240A, may cause the stand-in engine server 240 to perform processes described herein, including processes associated with the stand-in engine 140, such as those performed by the data ingestion engine 142, batch ingestion data pipeline 144, network attached storage 148, data file consumer 150, continuous streaming data pipeline 146, event streaming platform 152, streaming data consumer 154, or other components.

In some embodiments, the data publication instructions 256, when executed by one or more processors of the server processor set 240A, may cause the stand-in engine server 240 to perform processes described herein, including processes associated with the stand-in engine 140, such as those performed by the data publication service 156 or other components.

In some embodiments, the repository instructions 258, when executed by one or more processors of the server processor set 240A, may cause the stand-in engine server 240 to perform processes described herein, including processes associated with the stand-in engine 140, such as those performed by the proxy state log repository 158 or other components.

In some embodiments, the operational state control instructions 262, when executed by one or more processors of the server processor set 240A, may cause the stand-in engine server 240 to perform processes described herein, including processes associated with the stand-in engine 140, such as those performed by the operational state controller 162 or other components.

In some embodiments, the segregated resource entity information instructions 264, when executed by one or more processors of the server processor set 240A, may cause the stand-in engine server 240 to perform processes described herein, including processes associated with the stand-in engine 140, such as those performed by the segregated resource entity information service 164 or other components.

The network 206 is a set of devices that facilitate communication from a sender to a destination, such as by implementing communication protocols. Example networks 206 include local area networks, wide area networks, intranets, or the Internet. The network 206 may perform or facilitate processes described herein, including processes associated with the API gateways 106 or other components.

In this regard, FIG. 1 shows an example system environment 100 within which at least some embodiments of the present disclosure, including devices of the system 200, may operate. The depictions of the example system 100 and devices of system 200 are not intended to limit or otherwise confine the embodiments described and contemplated herein to any particular configuration of elements or systems, nor are they intended to exclude any alternative configurations or systems for the set of configurations and systems that can be used in connection with embodiments of the present disclosure. Rather, FIGS. 1-2 and the system environment 100 and system 200 disclosed therein are merely presented to provide an example basis and context for the facilitation of some of the features, aspects, and uses of the methods, apparatuses, computer readable media, and computer program products disclosed and contemplated herein. As noted above, in some embodiments, the resource authorization system 120, the stand-in engine 140, or the immutable audit record repository 110 may be embodied by one or more server devices such as the resource authorization system server 220, the stand-in engine server 240, or the immutable audit record server 210 shown in FIG. 2, respectively, or portions thereof relevant to the functions of the respective devices.

Example Processes

Figure 3:
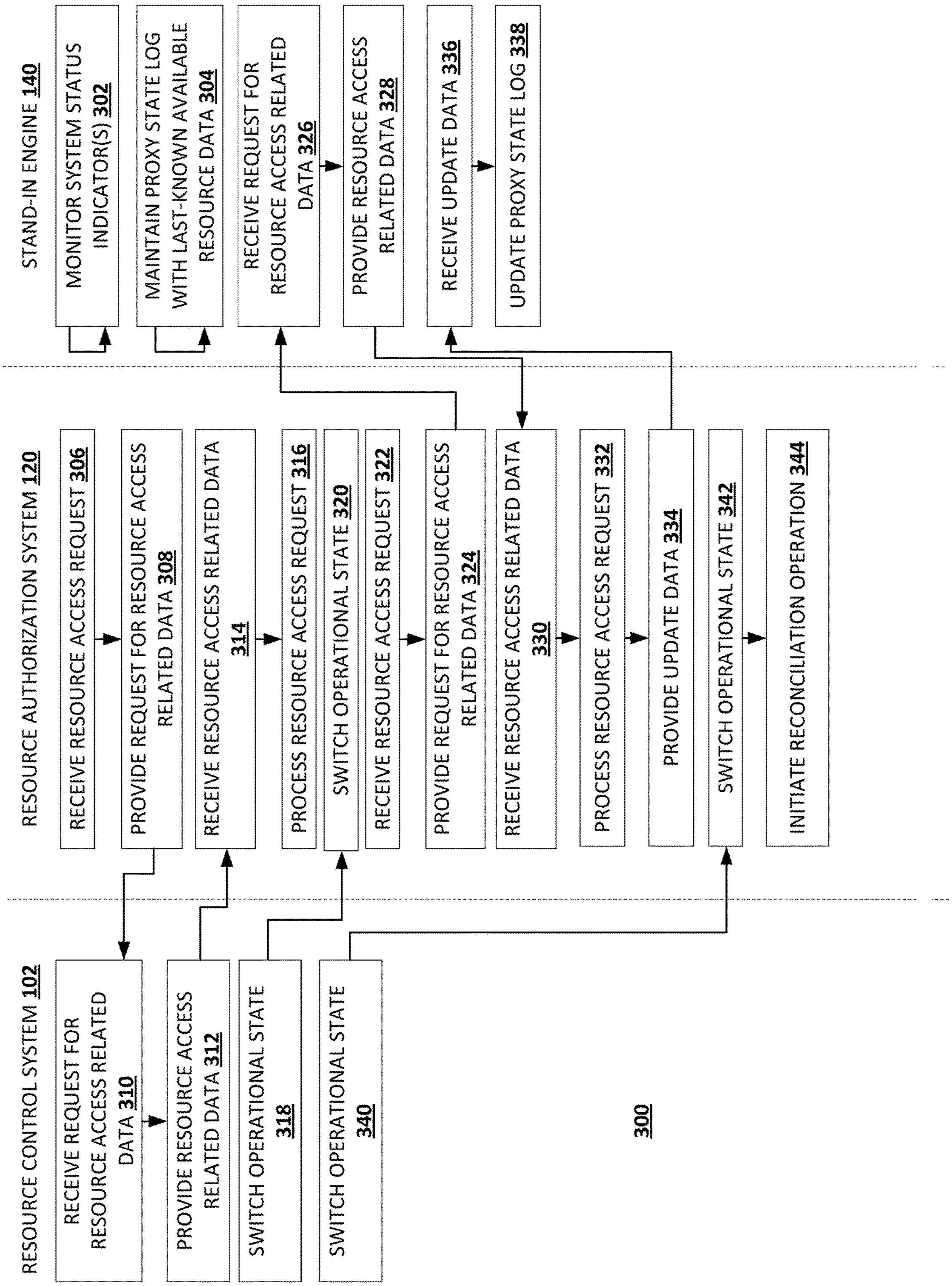
FIG. 3 illustrates an example process presented in accordance with at least some embodiments of the present disclosure.

FIG. 3 illustrates an example process 300 presented in accordance with at least some embodiments of the present disclosure. In some example embodiments, the entities and operations shown and described with reference to the process 300 of FIG. 3 may be embodied or performed by the various systems and devices shown and described with reference to FIGS. 1-2 and 4-5. In an example embodiment, the process 300 may facilitate operational continuity for the resource authorization system during system outages of the resource control system. Various operations of the process 300 may be optionally included or excluded from some embodiments, or certain embodiments may perform two or more operations of the process 300 in an alternative order or in parallel without departing from the scope of the present disclosure. As shown, the process 300 includes the resource control system 102, the resource authorization system 120, and the stand-in engine 140.

At operation 302, the stand-in engine 140 monitors one or more system status indicators associated with the resource control system 102. For example, the operational state controller 162 may monitor various system status indicators to determine an operational status of the resource control system 102 and determine when the resource control system 102 experiences an operational state change. In some examples, the stand-in engine 140 may perform API health checks, monitoring circuit breaker events, receive a Kafka notification, or receive an indication of an upcoming maintenance window from the resource control system 102 or other systems associated therewith. In some embodiments, the operation 302 may be continuously ongoing during the process 300.

At operation 304, the stand-in engine 140 maintains a proxy state log with last-known available resource data (e.g., the proxy state log repository 158 comprising last-known available resource data 160), for example, using data received from the resource control system 102 (e.g., via at least one of the batch ingestion data pipeline 144 or the continuous streaming data pipeline 146). In some embodiments, the operation 304 may be continuously ongoing during a default operational state (e.g., while the resource control system 102 is available).

In some embodiments, maintaining the proxy state log may include continuously updating the proxy state log with the data received from the resource control system 102, for example, so that if the resource control system 102 becomes unavailable, the latest data from the resource control system 102 is available to continue operations. In some embodiments, the last-known available resource data may be associated with a plurality of segregated resource entities or the last-known available resource data may include, for each of the plurality of segregated resource entities, at least one of resource availability data or resource consumption limit data. In some embodiments, the proxy state log may further include segregated resource entity metadata used to identify segregated resource entities associated with resource access requests.

At operation 306, the resource authorization system 120 receives a resource access request. For example, the resource access request may be received via a resource access channel (e.g., resource access channel 108), such as a funds transfer request initiated through an online banking application. At operation 308, the resource authorization system 120 provides a request for resource access related data necessary to process the resource access request to the resource control system 102. For example, the resource access request may include data characterizing a requested amount of resources to be transferred, an identifier for a source segregated resource entity, an identifier for a destination segregated resource entity, or authentication credentials associated with the request. For example, the resource authorization system 120 may request current resource availability data for the source segregated resource entity to verify sufficient resources exist to fulfill the transfer, resource consumption limit data to ensure the requested transfer does not exceed any applicable thresholds, and segregated resource entity metadata for both the source and destination segregated resource entities to validate the transfer can be completed between the identified accounts.

At operation 310, the resource control system 102 receives the request for the resource access related data and, in response, at operation 312, the resource control system 102 provides the requested resource access related data to the resource authorization system 120 for processing the resource access request. For example, the resource control system may provide the current resource availability data, resource consumption limit data, and segregated resource entity metadata. In some embodiments, the resource access related data may include restraint information indicating whether the segregated resource entity is subject to any blocks or restrictions, or other data used to process the resource access request.

At operation 314, the resource authorization system 120 receives the resource access related data from the resource control system 102 and, in response, at operation 316, processes the resource access request. For example, processing the funds transfer request may include determining whether to authorize or deny the funds transfer using the resource access related data received from the resource control system 102. In some embodiments, determining whether to authorize or deny the resource access request may include comparing the requested transfer amount against at least one of a resource availability value, a resource consumption limit, or resource hold data for the source segregated resource entity. For example, the resource authorization system 120 may verify that the source segregated resource entity has sufficient available resources to complete the transfer and that the transfer does not exceed any applicable daily or per-transaction limits.

Accordingly, the operations 306, 308, 314, and 316 performed by the resource authorization system 120 may be performed during a default operational state of the resource authorization system in which the resource authorization system uses data from the resource control system 102, for example, to process the resource access request. Additionally, during the operations 306, 308, 314, and 316, the resource control system 102 may be in a default operational state in which the resource control system 102 is available for access.

At operation 318, the resource control system 102 switches operational states. For example, the operational state change may be a change to an unplanned outage state identified by monitoring one or more system status indicators for the resource control system 102 to determine the resource control system 102 is unavailable. In another example, the operational state change may be a change to a planned outage state identified by receiving an indication of the planned outage state during which the resource control system 102 is unavailable.

At operation 320, the resource authorization system 120 switches operational states responsive to the operational state change associated with the resource control system 102. For example, the resource authorization system 120 may switch to a stand-in operational state in which the resource authorization system uses data from the proxy state log without synchronizing with the resource control system 102. For example, the stand-in engine 140 may detect the outage state of the resource control system 102 in association with the ongoing operation 302 and trigger the operational state change in the resource authorization system 120 (e.g., via operational state controller 162 or operational state controller 128).

At operation 322, the resource authorization system 120 receives another resource access request. At operation 324, the resource authorization system 120 provides a request for resource access related data to the stand-in engine 140. For example, because the resource authorization system 120 is in the stand-in operational state, the resource authorization system 120 uses the proxy state log maintained by the stand-in engine 140 rather than the resource control system 102. At operations 326, 328, and 330, the stand-in engine 140 receives the request for resource access related data, the stand-in engine 140 provides the requested resource access related data including last-known available resource data from the proxy state log, and the resource authorization system 120 receives the request resource access related data.

At operation 332, the resource authorization system 120 processes the resource access request during the stand-in operational state, for example, using last-known available resource data received from the stand-in engine 140. In some examples, processing the resource access request may include placing a processing lock on a segregated resource entity associated with the resource access request to enforce sequential processing of resource access requests during the stand-in operational state and determining whether to authorize or deny the resource access request using the data received from the proxy state log.

In some embodiments, determining whether to authorize or deny the resource access request may include comparing, using the proxy state log and for a segregated resource entity associated with the resource access request, the resource access request against at least one of a resource availability value, a resource consumption limit, or resource hold data. For example, the resource authorization system 120 may calculate an effective available resource value by applying resource hold data to the last-known available resource data and comparing the result against the requested amount. In some embodiments, the resource availability category may be selected from among a plurality of resource availability categories based on a resource availability-state hierarchy for the plurality of resource availability categories.

For example, a resource availability-state hierarchy may establish that a good funds balance (e.g., reflecting only fully settled resources) takes precedence over a current balance (e.g., reflecting settled and pending resources), which in turn takes precedence over an available balance (e.g., reflecting resources accessible for immediate consumption), such that during stand-in processing of a funds transfer request, the resource authorization system 120 may select a good funds balance over an available balance to ensure a more conservative authorization decision.

In some embodiments, processing the resource access request may include authorizing the resource access request and generating, based on the resource access request, a resource reservation lock for the segregated resource entity associated with the request. For example, the resource reservation lock may be configured to characterize a provisional change to the last-known available resource data and may be configured with a predetermined duration to expiration.

At operation 334, the resource authorization system 120 provides update data to the stand-in engine 140. For example, the update data may include or characterize the processed resource access request. In some examples, the update data may include, be used to calculate, or otherwise be associated with resource hold data characterizing a provisional net change to be applied to the last-known available resource data caused by the resource authorization system 120 processing the resource access request during the stand-in operational state. In some embodiments, the update data may include resource reservation lock data or other data characterizing the authorization decision.

At operation 336, the stand-in engine 140 receives the update data from the resource authorization system 120. At operation 338, the stand-in engine 140 updates the proxy state log based on the received data. For example, the stand-in engine 140 may update the proxy state log based on the resource access request processed by the resource authorization system 120 during the stand-in operational state. For example, updating the proxy state log may include updating resource hold data for the segregated resource entity to reflect the authorized resource access request. Additionally or alternatively, updating the proxy state log may include updating resource consumption limit data.

At operation 340, the resource control system 102 switches operational states, for example, back to a default operational state. For example, the resource control system 102 may return to being available following completion of scheduled maintenance or recovery from an unexpected failure.

At operation 342, the resource authorization system 120 switches operational states responsive to the operational state change associated with the resource control system 102, for example, back to the default operational state. For example, the resource authorization system 120 may resume using data from the resource control system 102 when processing subsequent resource access requests. For example, the stand-in engine 140 may detect the return of the resource control system 102 to the default operational state in association with the ongoing operation 302 and trigger the operational state change in the resource authorization system 120 (e.g., via operational state controller 162 or operational state controller 128).

At operation 344, the resource authorization system 120 initiates a reconciliation operation to update the resource control system 102 based on the proxy state log. For example, the resource authorization system 120 may perform the reconciliation operation via a reconciliation engine (e.g., reconciliation engine 130). Additionally or alternatively, in some embodiments, the stand-in engine 140 may perform the reconciliation operation. In some embodiments, the reconciliation operation may include merging data from the proxy state log and data from the immutable audit record with one or more data stores of the resource control system 102. For example, the reconciliation engine 130 may update the resource control system 102 to reflect the resource access requests that were authorized during the stand-in operational state, ensuring that the resource access related data maintained by the resource control system 102 accurately reflects the changes that occurred while the resource control system 102 was unavailable.

In some embodiments, the data from the proxy state log and the data from the immutable audit record may be merged with the one or more data stores according to one or more deterministic rules using at least one of timestamp data or data version information. For example, the deterministic rules may establish precedence for resolving conflicts between data in the proxy state log and data in the resource control system 102 based on when each data element was created or modified. In some embodiments, the reconciliation operation may include clearing expired resource reservation locks based on a corresponding predetermined duration to expiration. For example, resource reservation locks associated with resource access requests that were authorized during the stand-in operational state but ultimately did not settle may be automatically cleared if the predetermined duration to expiration has elapsed.

In some embodiments, the resource control system 102, resource authorization system 120, or the stand-in engine 140 may maintain an immutable audit record of activity associated with at least one of the proxy state log, the resource authorization system 120 during the stand-in operational state, or the reconciliation operation. For example, the immutable audit record may include data characterizing at least one of reads and writes for the proxy state log, updates to the last-known available resource data, authorization decisions of the resource authorization system 120 during the stand-in operational state, resource reservation locks, or merges between the proxy state log and one or more data stores of the resource control system 102. For example, each authorization decision, resource hold update, resource reservation lock, or data merge may be logged to the immutable audit record (e.g., via the immutable audit record repository 110). Accordingly, in some embodiments, any one or more of the operations of process 300 or other processes described herein may be characterized or logged via the immutable audit record.

Figure 4:
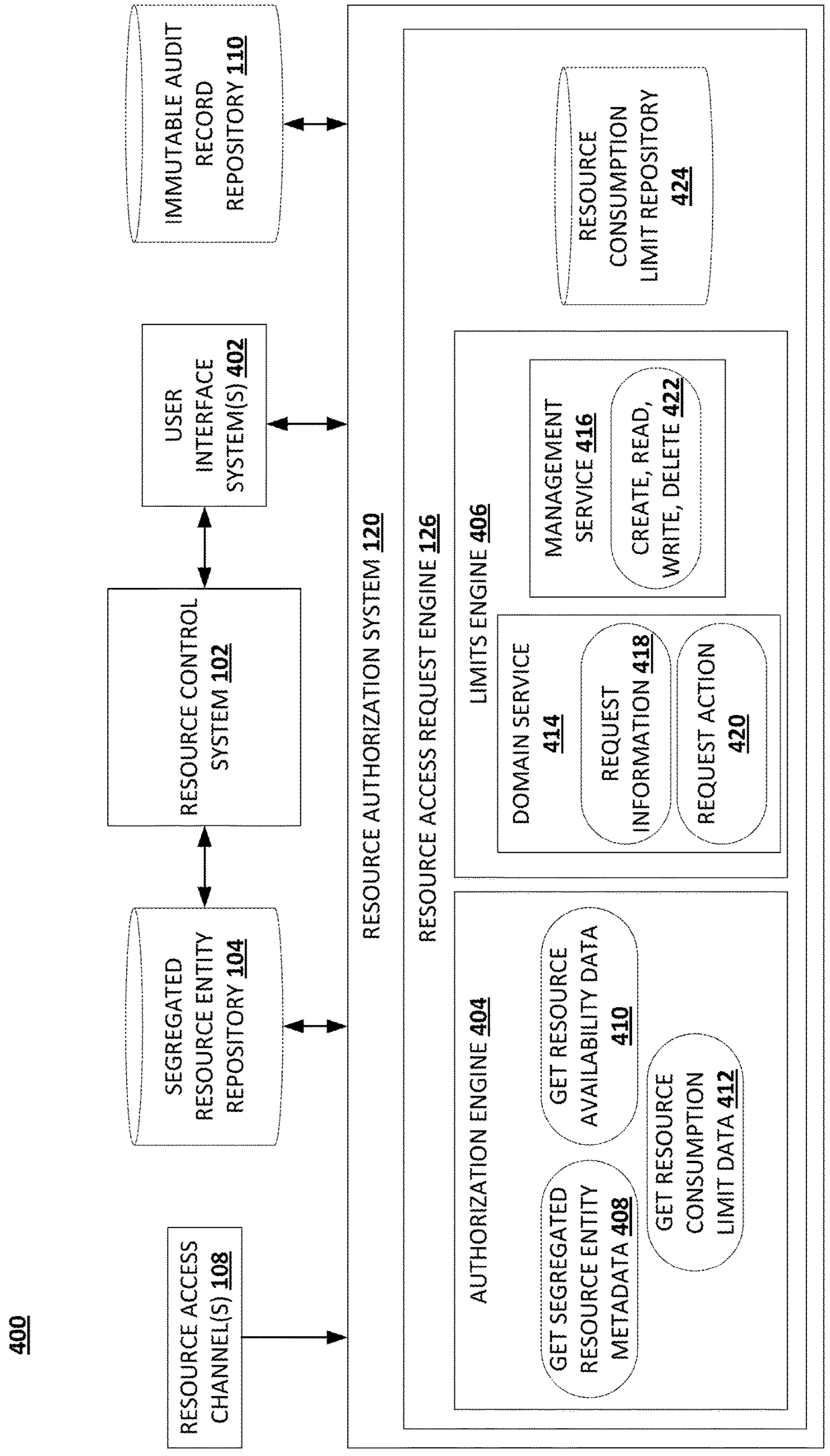
FIG. 4 illustrates an example system environment within which at least some embodiments of the present disclosure may operate.

FIG. 4 illustrates an example system environment 400 within which at least some embodiments of the present disclosure may operate. In some example embodiments, the entities and operations shown and described with reference to FIG. 4 may be embodied or performed by the various systems and devices shown and described with reference to FIG. 1-2 or 5. In an example embodiment, the system environment 400 may facilitate the maintenance of resource consumption limit data for the resource authorization system. Various operations or components described or shown with reference to FIG. 4 may be optionally included or excluded from some embodiments, or certain embodiments may perform two or more operations in an alternative order or in parallel without departing from the scope of the present disclosure.

As shown, the system environment 400 includes one or more user interface system 402, the resource control system 102, the segregated resource entity repository 104, the resource access channels 108, the immutable audit record repository 110, and the resource authorization system 120. The resource authorization system 120 includes the resource access request engine 126. The resource access request engine 126 includes an authorization engine 404, a limits engine 406, and a resource consumption limit repository 424. The authorization engine 404 is configured to perform operations 408, 410, and 412. The limits engine 406 includes a domain service 414 configured to perform operations 418 and 420 and a management service 416 configured to perform operations 422.

In some embodiments, the user interface system 402 may include one or more computing devices, servers, or software services configured to provide interfaces for users or external systems to interact with the resource authorization system 120. For example, the user interface system 402 may include or otherwise be associated with an operations control interface, a customer communication platform, or other systems configured to facilitate interactions with the resource authorization system 120 including, but not limited to, configuring resource access related data maintenance logic, resource access request processing logic, or operational state control logic. For example, an administrative entity may use the user interface system 402 to configure operational functionalities of the resource authorization system 120 for processing resource access requests or maintaining resource access related data.

In some embodiments, the authorization engine 404 may be configured to perform authorization decisions for resource access requests. In some examples, the authorization engine 404 may be configured to retrieve segregated resource entity metadata, resource availability data, or resource consumption limit data, for example, from the resource control system 102, the segregated resource entity repository 104, or the proxy state log to process resource access requests. For example, the authorization engine 404 may query customer information services or account mapping repositories to obtain account identifiers, product codes, or other metadata used to process resource access requests. In another example, the authorization engine 404 may retrieve last-known available resource data when the resource control system 102 is unavailable.

In some embodiments, the limits engine 406 may be configured to manage resource consumption limit data associated with segregated resource entities. For example, the domain service 414 may be configured to handle or make inquiries regarding resource consumption limits for segregated resource entities such as querying the segregated resource entity repository 104 for resource consumption limits when processing a resource access request. In another example, the domain service 414 may be configured to update or apply resource consumption limits during resource access request processing. In some embodiments, the domain service 414 may be configured to facilitate various database management functionalities, including querying from or writing to databases (e.g., the segregated resource entity repository 104, resource consumption limit repository 424, or immutable audit record repository 110).

In some embodiments, the management service 416 may be configured to perform create, read, update, and delete operations for resource consumption limit data or other configurable functionalities of the resource authorization system 120. For example, the management service 416 may be associated with the user interface system 402 to facilitate configurability of the resource authorization system 120 or components thereof by a user.

In some embodiments, the resource consumption limit repository 424 may be configured to persist resource consumption limit data. For example, the resource consumption limit repository 424 may include or otherwise be associated with a database system configured to store resource consumption limits, such as daily overdraft limits, transaction frequency limits, or channel-specific limits for segregated resource entities.

In some embodiments, the resource access request engine 126 may support processing resource access requests from multiple payment rails including real-time payment networks, wire transfer systems, and internal transfer mechanisms during the stand-in operational state. For example, resource access requests received via the resource access channel 108 may originate from various payment rails, and the resource access request engine 126 may process such requests using data from the proxy state log repository 158 or resource control system 102.

In some embodiments, the resource access request engine 126 may apply rail-specific policy overlays including cutoff times, sanctions checks, or participant status during the stand-in operational state. For example, the authorization engine 404 may evaluate rail-specific rules in conjunction with resource availability data and resource consumption limit data when determining whether to authorize or deny a resource access request during the stand-in operational state. In some embodiments, the resource authorization system 120 or components thereof may communicate with the immutable audit record repository 110 to log authorization decisions, resource consumption limit inquiries, or other activity associated with processing resource access requests.

Figure 5:
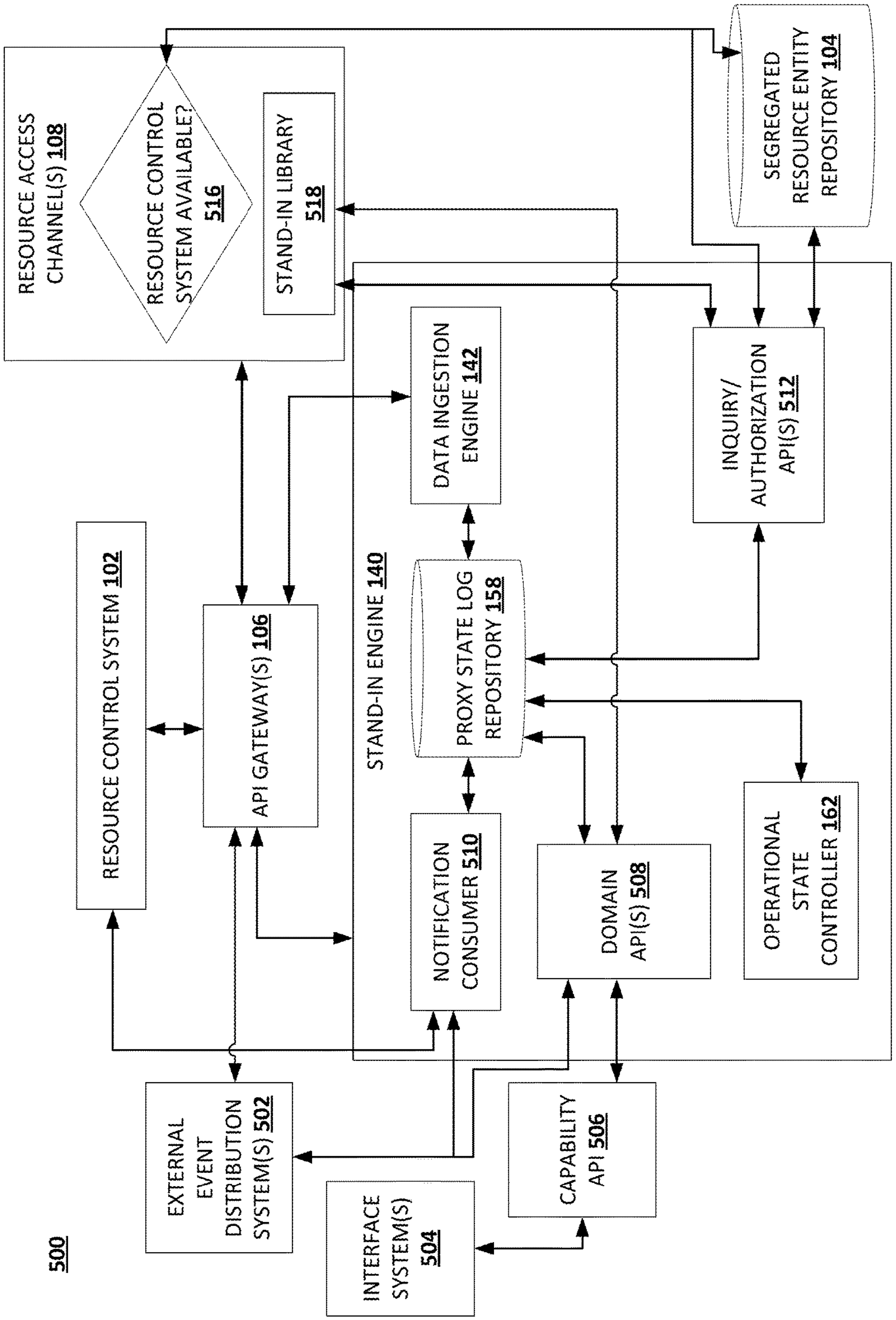
FIG. 5 illustrates an example system environment within which at least some embodiments of the present disclosure may operate.

FIG. 5 illustrates an example system environment 500 within which at least some embodiments of the present disclosure may operate. In some example embodiments, the entities and operations shown and described with reference to FIG. 5 may be embodied or performed by the various systems and devices shown and described with reference to FIG. 1-2 or 4. In an example embodiment, the system environment 500 may facilitate switching between default and stand-in operational states. Various operations or components described or shown with reference to FIG. 5 may be optionally included or excluded from some embodiments, or certain embodiments may perform two or more operations in an alternative order or in parallel without departing from the scope of the present disclosure.

As shown the system environment 500 includes the resource control system 102, the segregated resource entity repository 104, the API gateways 106, the resource access channels 108, the stand-in engine 140, an external event distribution system 502, one or more interface systems 504, and a capability API 506. The stand-in engine 140 includes the data ingestion engine 142, the proxy state log repository 158, the operational state controller 162, one or more domain APIs 508, a notification consumer 510, and one or more inquiry/authorization APIs 512. The one or more resource access channels 108 include a stand-in library 518.

In some embodiments, the stand-in engine 140 may be implemented as a component of the resource authorization system (e.g., resource authorization system 120), as a separate system, or as a combination thereof. Accordingly, functionalities described herein with reference to the stand-in engine 140 may be performed by the resource authorization system, and functionalities described with reference to the resource authorization system may be performed by the stand-in engine 140. In some embodiments, the stand-in engine 140 and the resource authorization system may share one or more hardware components, software components, or both. Accordingly, references to either the stand-in engine 140 or the resource authorization system performing a particular function should be understood to encompass implementations in which the other performs that function or in which both perform that function in coordination. For example, as described with reference to FIG. 5, it should be understood that the stand-in engine 140 changing operational states as described herein may coincide with the resource authorization system changing operational states.

In some embodiments, the external event distribution systems 502 may provide various system status indicators to the stand-in engine 140. In some embodiments, the external event distribution system 502 may include one or more computing devices, servers, message brokers, or event routing platforms associated with the resource control system 102 and configured to distribute events, notifications, or other data to the stand-in engine 140. For example, the external event distribution system 502 may include or otherwise be associated with activity monitoring systems, communication hub platforms, or other event distribution infrastructure configured to route operational events, alerts, or notifications to the notification consumer 510, among other computer-based entities. In some examples, the external event distribution system 502 may facilitate distribution of events characterizing operational state changes such as system health updates, scheduled maintenance notifications, performance degradation alerts, connectivity status changes, or other operational information.

In some embodiments, the notification consumer 510 may include one or more computing devices, software services, or message listeners configured to receive notifications and updates from various sources. For example, the notification consumer 510 may subscribe to event streams from the external event distribution system 502 or the resource control system 102 to receive real-time updates regarding operational state changes or operational performance. In some embodiments, the notification consumer 510 may process received notifications, update the proxy state log repository 158, or trigger actions (e.g., circuit-breaker events or operational state changes) via the operational state controller 162.

In some embodiments, the interface systems 504 may include one or more computing devices, servers, or software services configured to provide interfaces for users or external systems to interact with the stand-in engine 140. For example, the user interface system 504 may include or otherwise be associated with an operations control interface or administrative tools configured to facilitate manual or automated control of the stand-in engine 140 including, but not limited to, configuring operational state control logic or proxy state log repository logic. In some embodiments, the interface systems 504 may be used by a user or automated system to provide availability flags for various services or systems, such as the resource control system 102. In some examples, an administrative entity may use the interface systems 504 to configure operational functionalities of the stand-in engine 140 for monitoring system status indicators, changing operational states, or maintaining last-known available resource data. In some embodiments, the user interface system 504 may connect to the capability API 506 which in turn may connect to the domain APIs 508 to facilitate interactions with the stand-in engine 140.

In some embodiments, the capability API 506 may include one or more interfaces configured to expose operational capabilities of the stand-in engine 140. For example, the capability API 506 may provide endpoints for querying system status or configuring operational states or stand-in parameters. In some embodiments, the domain API 508 may include one or more interfaces configured to provide domain-specific operations for the stand-in engine 140. For example, the domain API 508 may provide interfaces for accessing the proxy state log repository 158, managing segregated resource entity information, or coordinating with other components of the stand-in engine 140. In some embodiments, the domain API 508 may provide or receive notifications to or from the resource access channels 108, for example, indicating an operational state of the resource control system 102 or stand-in engine 140.

In some embodiments, the inquiry/authorization APIs 512 may include one or more interfaces configured to facilitate communications between various components including, but not limited to, the stand-in engine 140, the resource access channels 108, and the segregated resource entity repository 104. For example, the inquiry/authorization APIs 512 may provide endpoints for providing or receiving resource availability data, resource consumption limit data, segregated resource entity metadata, availability flags for various systems or services (e.g., the resource control system 102), or operational notifications.

In some embodiments, the inquiry/authorization APIs 512 may facilitate the transfer of data for maintaining the proxy state log or processing resource access requests. For example, in an example embodiment where the stand-in engine 140 is a component of the resource authorization system 120, during a default operational state, the inquiry/authorization APIs 512 may retrieve data from the segregated resource entity repository 104, and during a stand-in operational state, the inquiry/authorization APIs 512 may retrieve data from the proxy state log repository 158. In some embodiments, the inquiry/authorization APIs 512 may provide endpoints for resource access requests or authorization decisions.

In some embodiments, the inquiry/authorization APIs 512 may connect to the segregated resource entity repository 104 or the proxy state log repository 158 to facilitate the transfer of segregated resource entity metadata in association with resource access requests. In some embodiments, the inquiry/authorization APIs 512 may facilitate operational state change notifications (e.g., startup notifications, availability flags) between the stand-in engine 140 and the resource access channels 108 (e.g., via the stand-in library 518). In some examples, the inquiry/authorization APIs 512 may be used to broadcast operational statuses of the resource control system 102, resource authorization system, or stand-in engine 140.

In some embodiments, the resource access channels 108 may perform routing for resource access requests or resource access related data associated therewith differently depending on operational states of the stand-in engine 140 or resource control system 102 For example, at 516, a resource access channel may include logic configured to determine whether the resource control system 102 is available. For example, the decision 516 may evaluate availability flags received via the inquiry/authorization APIs 512 to determine whether resource access requests should be routed to the resource control system 102 during default operational states or the stand-in engine 140 (e.g., or resource authorization system) during stand-in operational states using the stand-in library 518.

In some embodiments, the stand-in library 518 may include software components, modules, or libraries configured to facilitate various interactions with or functionalities associated with the stand-in engine 140 or resource authorization system. For example, the stand-in library 518 may provide interoperability between the resource access channels 108 and the stand-in engine 140 during stand-in operational states. In some embodiments, the stand-in library 518 may be invoked by a resource access channel 108 when the decision 516 determines that the resource control system 102 is unavailable.

In some embodiments, the operational state controller 162 may be configured to manage operational state changes for the stand-in engine 140 (e.g., or resource authorization system). For example, the operational state controller 162 may synchronize operational state changes between the resource authorization system and the stand-in engine 140 responsive to operational state changes of the resource control system 102. For example, the operational state controller 162 may monitor API response codes from the API gateway 106, message queue depth or lag indicators from the data ingestion engine 142, indications received by the notification consumer 510 (e.g., indications of planned outage states), or combinations thereof to determine the occurrence of circuit breaker events (e.g., a threshold number of system failure events or a specific combination of system status indicators satisfying a specific combination of thresholds) to detect when the resource control system 102 experiences an operational state change.

Figure 6A:
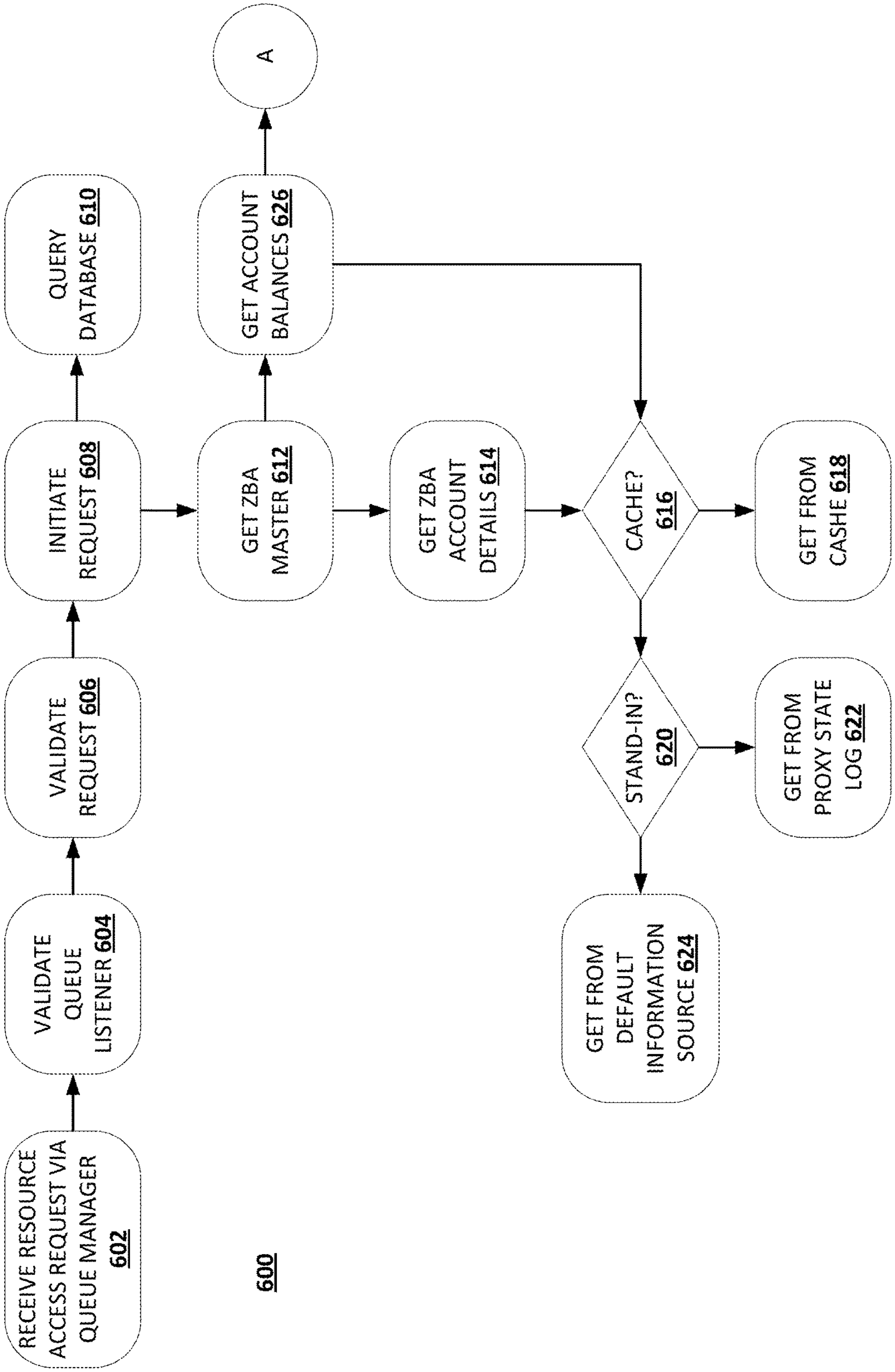
FIGS. 6A and 6B illustrate an example process presented in accordance with at least some embodiments of the present disclosure.
Figure 6B:
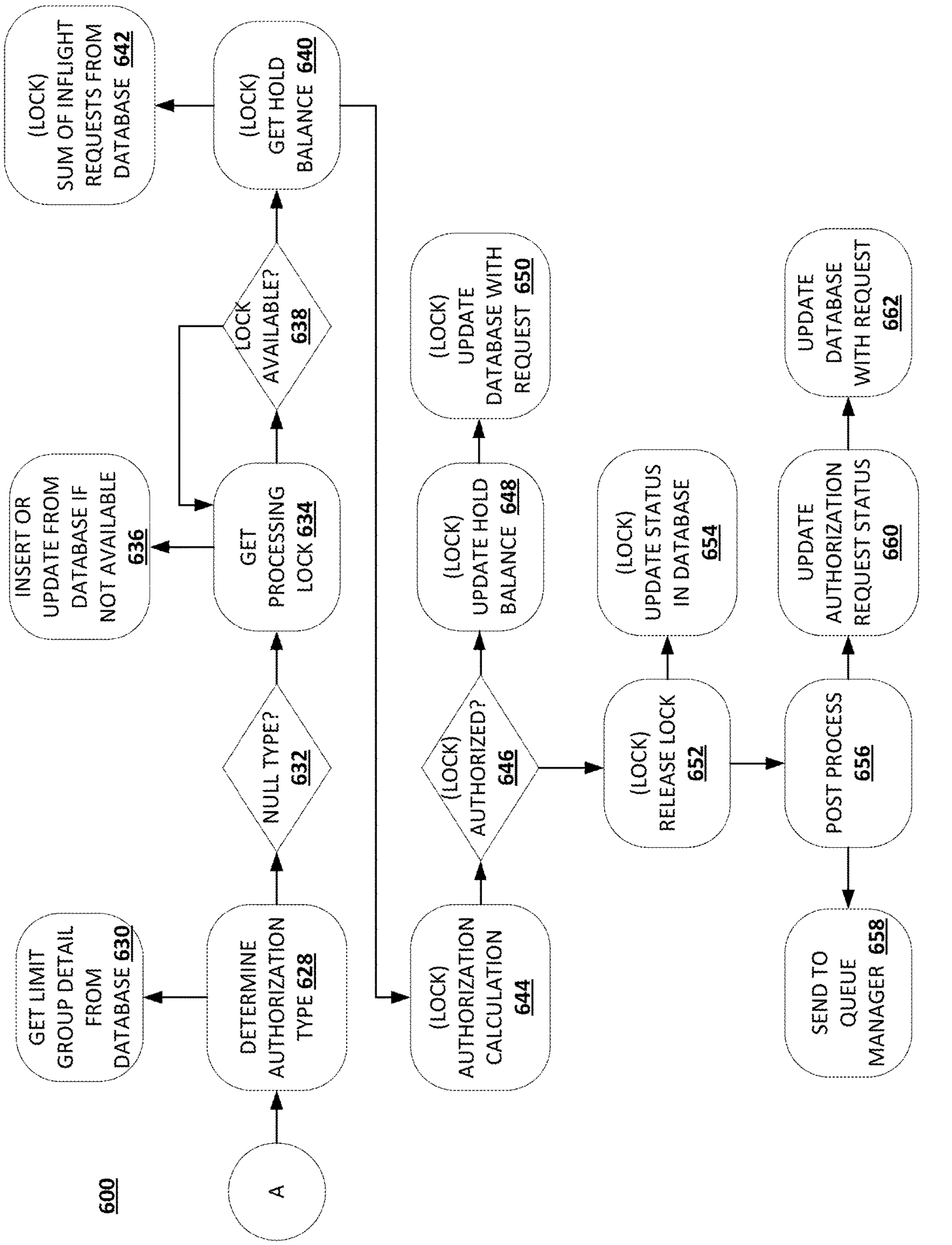

FIGS. 6A and 6B illustrate a process 600 presented in accordance with at least some embodiments of the present disclosure. In some example embodiments, the operations shown and described with reference to the process 600 of FIGS. 6A and 6B may be performed by the various systems and devices shown and described with reference to FIG. 1-2 or 4-5. In an example embodiment, the process 600 may facilitate authorization decisions for resource access requests, including when the resource control system 102 is unavailable. Various operations of the process 600 may be optionally included or excluded from some embodiments, or certain embodiments may perform two or more operations of the process 600 in an alternative order or in parallel without departing from the scope of the present disclosure.

With reference to FIG. 6A, the process 600 begins with an operation 602 in which a resource access request is received via a queue manager. For example, the resource access request may be received from a resource access channel (e.g., a payment validation service) that routes authorization requests to a message integration service queue manager for processing by the resource authorization system 120 (e.g., via the resource access request engine 126). Alternatively, in some embodiments, the resource access request may be received via an API (e.g., a REST API). In some embodiments, receiving the resource access request via an API may cause one or more operations of the process 600 to be performed synchronously (e.g., an API response to the resource access request may be provided synchronously with the reception of the resource access request).

At operation 604, a queue listener configured to receive the resource access request may be validated (e.g., to determine proper operation and authentication). For example, if the resource access request or queue listener is not valid, the process 600 may stop. At operation 606, the resource access request and queue listener are validated and the process 600 continues to operation 608. For example, the resource authorization system 120 may validate the format, content, and authentication credentials associated with the resource access request to ensure the request may be processed.

At operation 608, a request is initiated based on the resource access request. For example, the resource authorization system 120 may initiate processing of the validated resource access request by establishing a processing context and preparing to retrieve data associated with the request. At operation 610, a database (e.g., the segregated resource entity repository 104) may be queried to retrieve information associated with processing the request. For example, the resource authorization system 120 may retrieve information such as account configuration data, account identifiers, or processing parameters.

At operation 612, a zero balance account (ZBA) master may be retrieved. For example, the resource authorization system 120 may retrieve ZBA master data associated with the segregated resource entity identified in the resource access request (e.g., using data retrieved in operation 610). In some embodiments, various operations may be performed to retrieve the ZBA master. For example, at operation 614, ZBA account details may be obtained. For example, the resource authorization system 120 may obtain detailed account information including account relationships, product configurations, or other segregated resource entity metadata. In some embodiments, at operation 616, a determination may be made regarding whether such ZBA account details are available in a cache. For example, the resource authorization system 120 may check whether the ZBA master data or account details are available in a temporary cache to reduce database query latency. If the data is available in the cache, the process 600 proceeds to operation 618 in which the data is retrieved from the cache.

If the data is not available in the cache, the process 600 proceeds to 620 in which a determination is made regarding whether the system is in a stand-in operational state. For example, the resource authorization system 120 (e.g., via the operational state controller 128) may evaluate operational state flags or other data or conditions to determine whether the resource control system 102 is available or whether the resource authorization system 120 is operating in the stand-in operational state. If the system is in the stand-in operational state, the process 600 proceeds to operation 622 in which the data is retrieved from the proxy state log. If the system is not in the stand-in operational state, the process 600 may proceed to operation 624 and retrieve the data from a default information source (e.g., the resource control system 102).

At operation 626, account balances may be obtained. For example, the resource authorization system 120 (e.g., via the resource control system 102 or the proxy state log repository 158) may retrieve resource availability data including one or more resource availability categories for the segregated resource entity associated with the resource access request. Similar to operation 614, in some embodiments, the account balances retrieved at operation 626 may be obtained from the cache if available based on the decision at operation 616, or, based on whether the stand-in operational state is active at decision 620, the account balances may be retrieved from the proxy state log at operation 622 or from a default information source at operation 624 (e.g., the resource control system 102).

The process 600 continues with reference to FIG. 6B. At operation 628, an authorization type may be determined. For example, the resource authorization system 120 (e.g., via the authorization engine 404) may determine the type of authorization to be performed based on the resource access request parameters, the segregated resource entity configuration, the type of request initiated at operation 608, or the like. To determine the authorization type, at operation 630, limit group details may be retrieved from a database. For example, the resource authorization system 120 (e.g., via the limits engine 406) may retrieve resource consumption limit data associated with the segregated resource entity, including daily overdraft limits, transaction frequency limits, or channel-specific limits from the resource control system 102 or the proxy state log repository 158.

In some non-limiting contextual examples, the authorization type determined at operation 628 may be established in association with a resource consumption limit group creation (e.g., a daily overdraft limit group creation) by a risk assessment system (e.g., a credit risk system) that may assign an authorization type selected from among predefined types or values (e.g., A, B, C, or S) for a segregated resource entity (e.g., a customer or account group). The assigned authorization type may be persisted and subsequently retrieved from a database during authorization processing at operation 630. For example, the authorization type may govern how an authorization calculated is performed during stand-in processing. For example, if the authorization type is null, authorization calculation may be limited to a good funds balance only; if the authorization type is "A" the authorization calculation may include an account-level good funds balance plus an applicable daily overdraft limit, minus a hold balance; if the authorization type is "B" the authorization calculation may include an aggregated good funds balance across all accounts in a defined group minus a hold balance; if the authorization type is "C" the authorization calculation may include an aggregated good funds balance across a group plus a daily overdraft limit, minus a hold balance; and if the authorization type is "S" the authorization calculation may include an account-level good funds balance plus a daily overdraft limit reduced by a sum of negative balances across a group, minus a hold balance.

In some embodiments, such use of authorization type-based authorization calculations during stand-in operations may be used to dynamically constrain or expand authorization decisioning in the absence of the resource control system. For example, by applying a calculation model corresponding to a determined authorization type, the resource authorization system may be able to deterministically apply various permissible and preconfigured authorization constraints, even without access to the resource control system. In some embodiments, this may enable the resource authorization system to safely support heterogeneous account or group configurations, prevent over-allocation of resources, prevent excessive rejection of requests, and preserve consistency for subsequent reconciliation operations.

At operation 632, a determination may be made regarding whether the authorization type is null. If the authorization type is null, the process 600 may stop. If the authorization type is not null, the process 600 may continue to operation 634 in which the system attempts to obtain a processing lock. For example, the resource authorization system 120 (e.g., via the resource access request engine 126) may place a processing lock on the segregated resource entity associated with the resource access request (e.g., to enforce sequential processing of a plurality of resource access requests during the stand-in operational state). In some embodiments, at operation 636, a processing lock may be retrieved from a database if available or, if not available, may be generated. Additionally, a database or record may be updated to reflect the status of the processing lock in association with the segregated resource entity. At operation 638, if a processing lock has not been obtained, the process 600 may return to operation 634 and reattempt to obtain a processing lock. Once a processing lock is obtained, the process 600 may proceed to operation 640. As shown, the processing lock may remain engaged during operations 640, 642, 644, 646, 648, 650, 652, and 654 until the processing lock is released in association with operation 652.

At operation 640, a resource hold balance may be retrieved. For example, the resource authorization system 120 (e.g., via the proxy state log repository 158) may retrieve resource hold data for the segregated resource entity. In some embodiments, during the stand-in operational state, the resource authorization system 120 may calculate an effective or stand-in balance or limit by combining resource availability data with resource hold data from other resource access requests processed during the same stand-in operational state. For example, retrieving the resource hold data at operation 640 may include operation 642 in which a sum of inflight resource access requests is retrieved from a database. For example, the resource authorization system 120 may retrieve data characterizing pending or in-progress resource access requests for the segregated resource entity to account for resources that have been provisionally allocated but not yet confirmed.

At operation 644, an authorization calculation may be performed. For example, the resource authorization system 120 (e.g., via the authorization engine 404) may determine whether to authorize or deny the resource access request using the proxy state log by comparing, for the segregated resource entity, the resource access request against at least one of a resource availability value, a resource consumption limit, or the resource hold data. At operation 646, a determination may be made regarding whether the resource access request is authorized based on the calculation. If the resource access request is denied, the decision may be logged (e.g., via the immutable audit record repository 110), a rejection indication may be issued, and the process 600 may stop. If the resource access request is authorized, the process 600 may proceed to operation 648 in which the resource hold balance may be updated to reflect the resource access request. For example, the resource authorization system 120 (e.g., via the proxy state log repository 158) may increment or decrement the resource hold data for the segregated resource entity to reflect the authorized resource access request.

Additionally, at operation 650, a database may be updated to persist the authorization decision, resource access request, or associated data. For example, a resource reservation lock may be inserted into the proxy state log repository 158 or logged by the immutable audit record repository 110. At operation 652, the processing lock may be released. Additionally, at operation 654, the status of the processing lock or segregated resource entity may be updated to reflect the release prior to or concurrently with operation 652. For example, the resource authorization system 120 (e.g., via the resource access request engine 126) may release the processing lock on the segregated resource entity after completing the authorization processing, allowing subsequent resource access requests for the same segregated resource entity to be processed.

At operation 656, one or more post-processing operations may be performed. For example, the resource authorization system 120 may perform additional processing operations following the authorization decision, such as generating audit records (e.g., via the immutable audit record repository 110) or preparing response data. At operation 658, response data may be sent to a queue manager for relay to an entity associated with providing the resource access request. For example, the resource authorization system 120 may send the authorization response to a message queue for delivery to the requesting system (e.g., via a resource access channel 108).

At operation 660, the authorization request status may be updated. For example, the resource authorization system 120 may update the status of the resource access request to reflect the completed authorization processing. At operation 662, a database may be updated with the authorized resource access request. For example, the resource authorization system 120 may persist final authorization data (e.g., update the proxy state log or immutable audit record).

Figure 7:
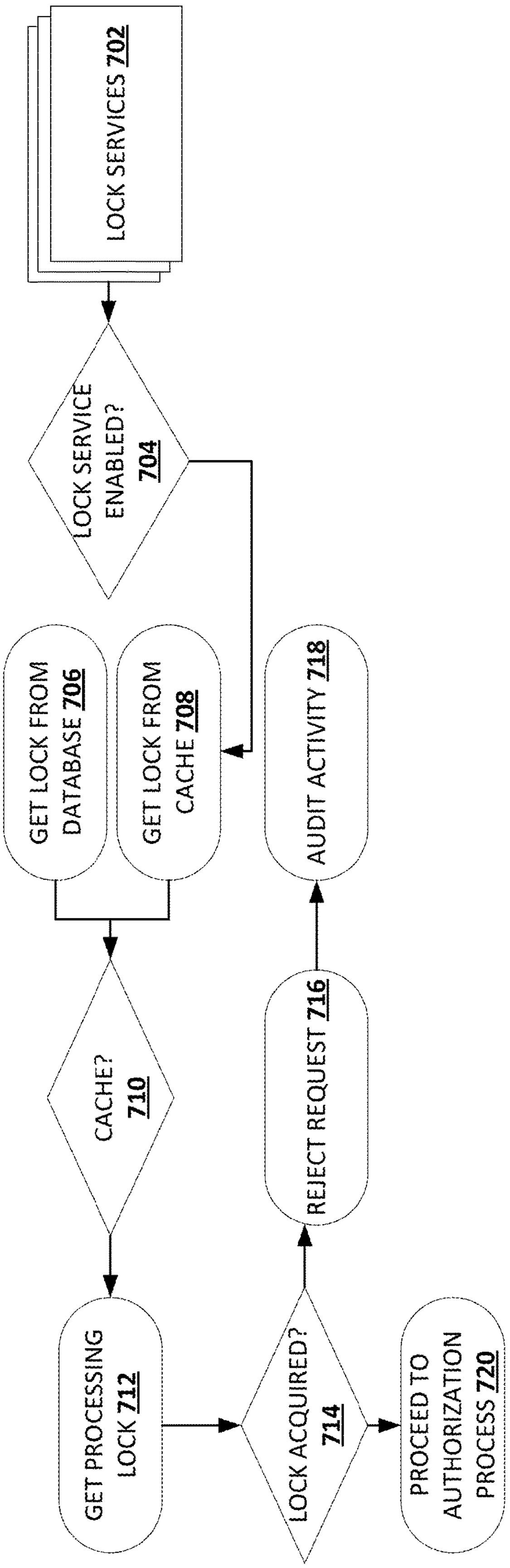
FIG. 7 illustrates an example process presented in accordance with at least some embodiments of the present disclosure.

FIG. 7 illustrates an example process 700 presented in accordance with at least some embodiments of the present disclosure. In some example embodiments, the operations shown and described with reference to the process 700 of FIG. 7 may be performed by the various systems and devices shown and described with reference to FIG. 1-2 or 4-5. In an example embodiment, the process 700 may facilitate acquiring processing locks to enforce sequential processing of resource access requests during a stand-in operational state. Various operations of the process 700 may be optionally included or excluded from some embodiments, or certain embodiments may perform two or more operations of the process 700 in an alternative order or in parallel without departing from the scope of the present disclosure.

The process 700 includes an operation 712 in which the system attempts to acquire a processing lock for a segregated resource entity associated with a resource access request. For example, the resource authorization system 120 (e.g., via the resource access request engine 126) may attempt to place a processing lock on the segregated resource entity to enforce sequential processing of resource access requests during the stand-in operational state. The process 700 includes multiple pathways for obtaining the processing lock.

In some embodiments, at 710, a determination may be made regarding whether to retrieve the processing lock or information associated therewith from a cache or from a database. For example, the resource authorization system 120 may evaluate cache availability or data freshness criteria to determine the retrieval source for the processing lock. If the cache path is selected, the process 700 may proceed to operation 708 in which the system may retrieve the processing lock or information associated therewith from the cache. For example, the resource authorization system 120 may retrieve lock status or lock metadata from a temporary cache to reduce latency during lock acquisition. In some embodiments, the process 700 may include a determination at 704 regarding whether one or more lock services 702 are available. For example, the resource authorization system 120 may evaluate which lock services 702 are enabled or accessible for the current processing context and retrieve the processing lock or information associated therewith using an applicable lock service 702.

If the database path is selected at 710, the process 700 may proceed to operation 706 in which the system retrieves the processing lock or information associated therewith from a database. For example, the resource authorization system 120 may query a database (e.g., a SQL database or other persistent data store) to retrieve an existing processing lock or current processing lock status for the segregated resource entity. Following retrieval of the processing lock at operation 712 (e.g., via operation 708 or operation 706), the process 700 may proceed to a determination at 714 regarding whether the processing lock was acquired. In some examples, the processing lock may not be acquired due to various conditions, such as no lock services 702 having been available during the acquisition attempt (e.g., in which case the system may retry the acquisition later or proceed to operation 706), or the segregated resource entity may already have an active processing lock held by another process (e.g., in which case the system may implement a timeout period before retrying the lock acquisition to allow the existing lock to be released).

In some embodiments, the process 700 may include reattempting to acquire the processing lock if the processing lock acquisition is initially unsuccessful. For example, a certain number of retries may be configured (e.g., 3 attempts) before rejecting an associated resource access request. In some embodiments, the resource authorization system may include various processing lock mechanisms or services, including, for example, one or more databases or one or more caches (e.g., including distributed caches and centralized caches). In some embodiments, the resource authorization system may include a various configurations for how to retrieve a processing lock or perform other operations. For example, a default configuration may include using a cache to retrieve the processing lock, and, in response to an issue encountered in association with the cache, a different configuration may be invoked (e.g., which may include using a database to retrieve the processing lock).

If the processing lock is acquired at operation 714, the process 700 may proceed to operation 720 in which an authorization process may be performed. For example, the resource authorization system 120 may continue to process the resource access request as described with reference to FIG. 6 or 8 and elsewhere herein. If the processing lock is not acquired at operation 714, the process 700 may proceed to operation 716 in which the resource access request may be rejected. For example, the resource authorization system 120 may generate a rejection response indicating that the resource access request cannot be processed due to the inability to acquire the processing lock. Following operation 716, the process 700 may proceed to operation 718 in which data characterizing the operations of the process 700, including, but not limited to, the rejection of the resource access request, may be logged to the immutable audit record (e.g., via the immutable audit record repository 110).

In some embodiments, the immutable audit record may capture data characterizing the lock acquisition attempt, the rejection of the resource access request, timestamps associated with the operations, or other data associated with the process 700. For example, the resource authorization system 120 may log the rejection to the immutable audit record repository 110 to maintain a complete record of resource access request processing during the stand-in operational state.

Figure 8:
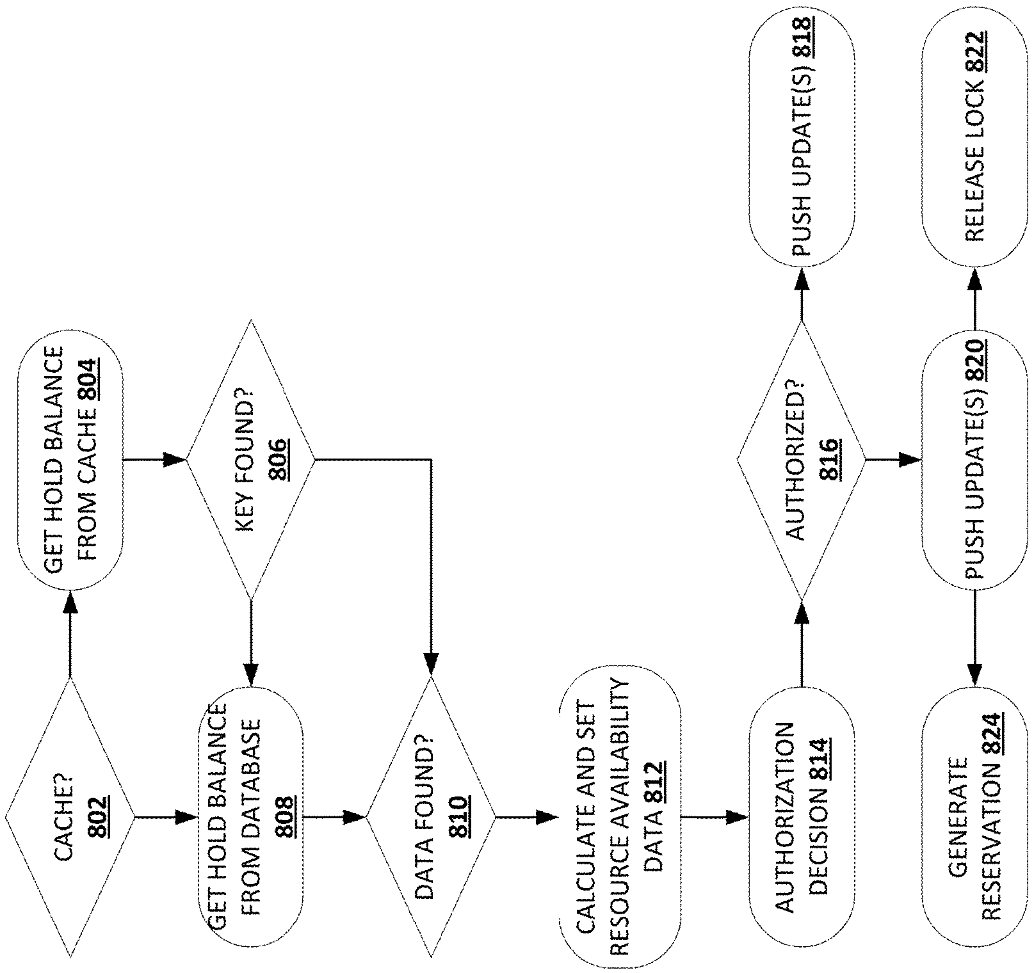
FIG. 8 illustrates an example process presented in accordance with at least some embodiments of the present disclosure.

FIG. 8 illustrates an example process 800 presented in accordance with at least some embodiments of the present disclosure. In some example embodiments, the operations shown and described with reference to the process 800 of FIG. 8 may be performed by the various systems and devices shown and described with reference to FIG. 1-2 or 4-5. In an example embodiment, the process 800 may facilitate resource hold data calculations for resource access requests during a stand-in operational state. Various operations of the process 800 may be optionally included or excluded from some embodiments, or certain embodiments may perform two or more operations of the process 800 in an alternative order or in parallel without departing from the scope of the present disclosure.

At 802, depending on whether a cache is available (e.g., enabled), the system may attempt to retrieve a resource hold balance from the cache or from a database (e.g., of the proxy state log repository 158). For example, the resource authorization system 120 may evaluate cache availability or data freshness criteria to determine whether to query the cache for resource hold data. If the cache is available, the process 800 may proceed to operation 804 and attempt to retrieve the hold balance from the cache. At operation 806, if a key corresponding to the segregated resource entity is found, the process 800 may proceed to operation 810. If a key is not found (e.g., indicating no cached data exists for the segregated resource entity), the process 800 may proceed to operation 808 to retrieve the hold balance from a database.

At 810, a determination may be made regarding whether the resource hold balance was found. If the resource hold balance is not found, the resource authorization system 120 may initialize resource hold data to a default value, retry, or the process 800 may stop. If the resource hold balance is found, the process 800 may proceed to operation 812 in which the system may calculate and set resource availability data based on the retrieved resource hold balance (e.g., or other resource hold data) and the resource access request. For example, the resource authorization system 120 may calculate a stand-in available amount based on the retrieved resource hold data and the last-known available resource data. For example, the resource authorization system 120 may calculate an effective resource availability value by applying the resource hold data to the last-known available resource data to determine the amount of resources available against which the resource access request may be compared. At operation 814, an authorization decision may be made. For example, the resource authorization system 120 (e.g., via the resource access request engine 126) may compare the resource access request against the calculated stand-in available amount or applicable resource consumption limits to determine whether to authorize or deny the resource access request.

At 816, if the resource access request is not authorized, the process 800 may proceed to operation 818 in which the system may push updates to reflect the denial. For example, the resource authorization system 120 may asynchronously update the immutable audit record repository 110 to log the denial decision. If the resource access request is authorized, the process 800 may proceed to operation 820 in which the system may push updates to reflect the authorization. For example, the resource authorization system 120 may asynchronously update the proxy state log repository 158 to reflect the authorized resource access request (e.g., update resource hold data).

At operation 822, the system may release the processing lock on the segregated resource entity. At operation 824, the system may generate a resource reservation lock for the authorized resource access request. For example, the resource reservation lock may represent or characterize the resource access request and be configured with a predetermined duration to expiration (e.g., 48 hours), after which the resource reservation lock may expire and be cleared during a reconciliation operation.

Figure 9:
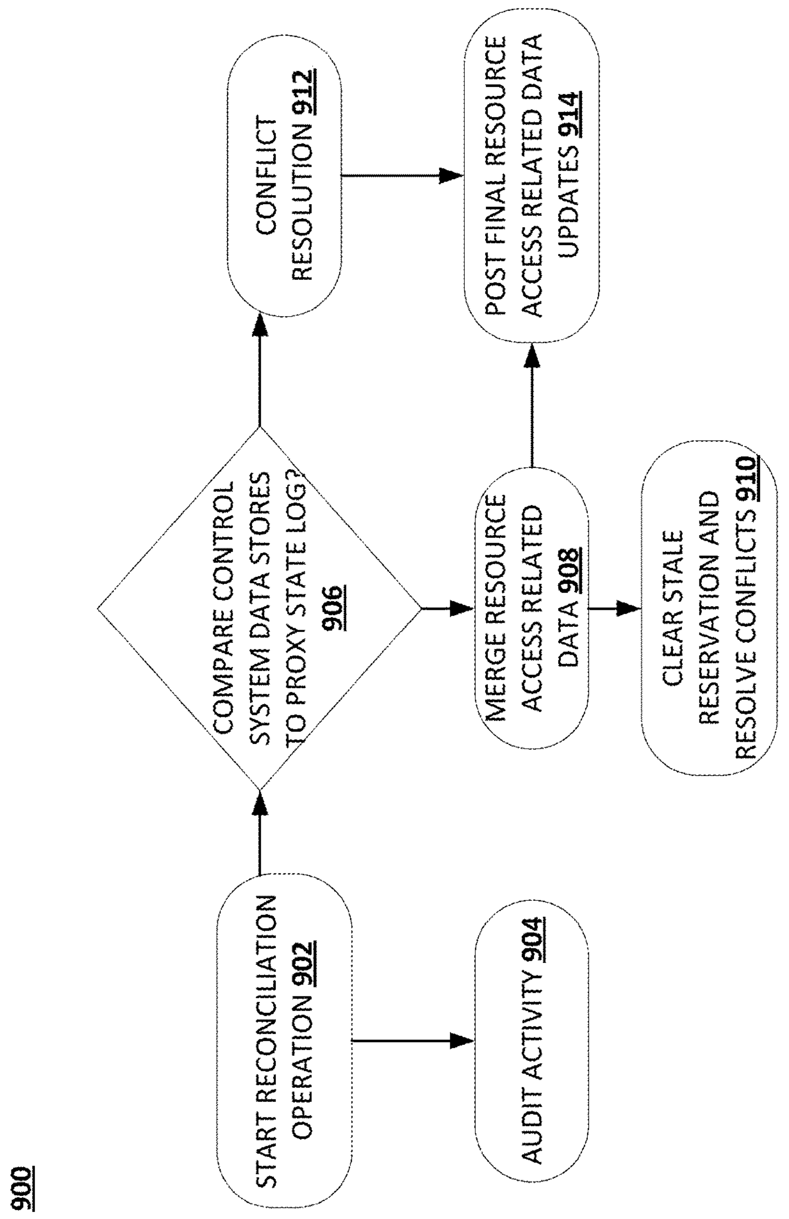
FIG. 9 illustrates an example process presented in accordance with at least some embodiments of the present disclosure.

FIG. 9 illustrates an example process 900 presented in accordance with at least some embodiments of the present disclosure. In some example embodiments, the operations shown and described with reference to the process 900 of FIG. 9 may be performed by the various systems and devices shown and described with reference to FIG. 1-2 or 4-5. In an example embodiment, the process 900 may facilitate reconciliation operations following an outage state of the resource control system. Various operations of the process 900 may be optionally included or excluded from some embodiments, or certain embodiments may perform two or more operations of the process 900 in an alternative order or in parallel without departing from the scope of the present disclosure.

The process 900 begins with an operation 902 in a reconciliation operation is initiated. For example, the resource authorization system 120 or stand-in engine 140 may detect or receive an indication that the resource control system 102 has returned to availability and trigger the transition from the stand-in operational state to the default operational state. At operation 904, activity associated with the reconciliation operation may be recorded to the immutable audit record. Operation 904 may be ongoing in association with the process 900. For example, the resource authorization system 120 or stand-in engine 140 may repeatedly emit reconciliation audit records to the immutable audit record repository 110 during the process 900 in association with the operations 906-914 or other operations.

At operation 906, the system may compare one or more data stores of the resource control system to the proxy state log. For example, the reconciliation engine 130 may compare resource access related data maintained by the resource control system 102 against the proxy state log repository 158 to identify differences that occurred during the stand-in operational state. In some embodiments, the comparison may evaluate resource availability data, resource consumption limit data, resource hold data, or resource reservation locks to determine which data elements require synchronization.

At operation 908, the system may merge resource access related data from the proxy state log with the data stores of the resource control system. For example, the reconciliation engine 130 may merge data from the proxy state log or data from the immutable audit record with one or more data stores of the resource control system 102 to update the data stores of the resource control system with information characterizing activity that occurred while the resource control system was in the outage state. In some embodiments, merging resource access related data may include consolidating stand-in transactions, resource availability data, resource consumption limit data, or resource reservation locks recorded during the outage state into the resource control system 102.

At operation 910, the system may clear stale resource reservation locks or resolve conflicts. For example, the reconciliation engine 130 may compare resource reservation locks against settled resource access requests in the resource control system 102 to determine whether each provisionally processed resource access request was completed. Resource reservation locks that have exceeded their predetermined duration to expiration and cannot be matched to a corresponding settled resource access request in the resource control system 102 may be cleared, and the associated provisional resource allocations may be reversed.

At operation 912, the system may perform conflict resolution. For example, the reconciliation engine 130 may apply deterministic rules to resolve discrepancies between the proxy state log and the data stores of the resource control system 102. For example, the data from the proxy state log and the data from the immutable audit record may be merged with the one or more data stores according to one or more deterministic rules using at least one of timestamp data or data version information. For example, the deterministic rules may establish that more recent timestamps or higher version numbers take precedence when merging conflicting data elements.

At operation 914, the system may post final resource access related data updates. For example, the reconciliation engine 130 may post confirmed resource access requests and final authorization decisions to the resource control system 102 to complete the reconciliation operation. In some embodiments, the posting may include updating resource availability data for segregated resource entities based on resource access requests that were authorized during the stand-in operational state, ensuring that the resource control system 102 accurately reflects all changes that occurred while the resource control system 102 was unavailable.

Figure 10:
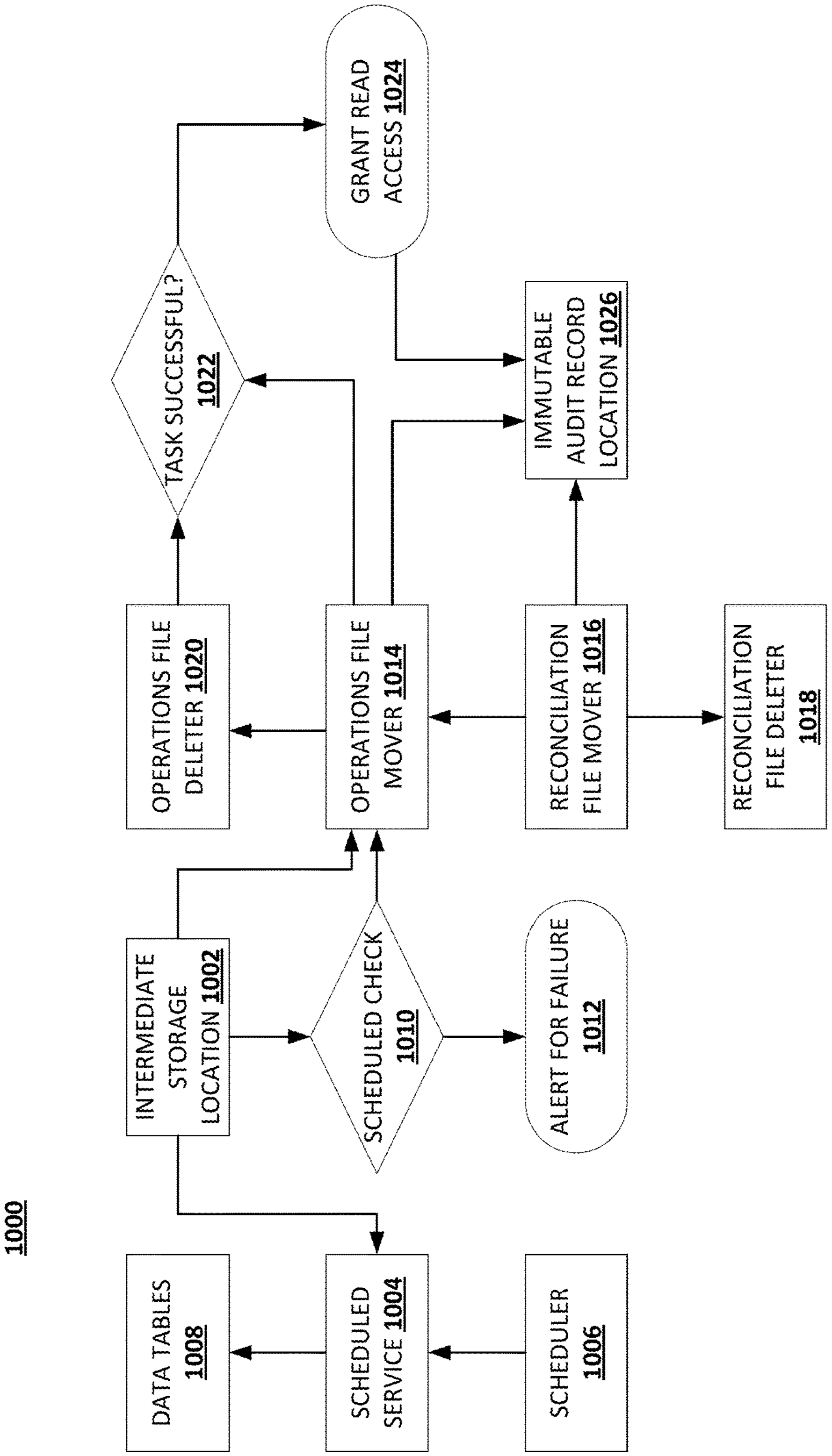
FIG. 10 illustrates an example process presented in accordance with at least some embodiments of the present disclosure.

FIG. 10 illustrates an example process 1000 presented in accordance with at least some embodiments of the present disclosure. In some example embodiments, the operations and entities shown and described with reference to the process 1000 of FIG. 10 may be performed or embodied by the various systems and devices shown and described with reference to FIG. 1-2 or 4-5. In an example embodiment, the process 1000 may facilitate data archival and audit record maintenance for the immutable audit record. Various operations of the process 1000 may be optionally included or excluded from some embodiments, or certain embodiments may perform two or more operations of the process 1000 in an alternative order or in parallel without departing from the scope of the present disclosure.

In some embodiments, the immutable audit record repository 110 may store records in a database (e.g., a SQL database) for a first retention period (e.g., 30 days) and may archive records to an archival system by sending files at scheduled intervals (e.g., daily) for a second retention period (e.g., 7 years). For example, the immutable audit record may include integration audit records and request audit records that capture each workflow and operations performed during processing of resource access requests, reconciliation operations, or other activity associated with the resource authorization system 120 or stand-in engine 140. In some embodiments, the immutable audit record may include one or more storage locations, versions, or systems. For example, the immutable audit record may be stored in a database in addition to a blockchain. For example, a database may provide a temporary storage system (e.g., one week, two weeks, three weeks, or more) for fast retrieval and a blockchain may provide tamper evident and permanent or long term storage.

The process 1000 includes a scheduler 1006 that initiates a scheduled service 1004. For example, the scheduler 1006 may be a time-based job scheduler configured to trigger the scheduled service 1004 at predetermined intervals (e.g., daily) to initiate data archival operations for the immutable audit record repository 110. The scheduled service 1004 may interact with data tables 1008 to retrieve data for archival. For example, the data tables 1008 may include database tables storing audit records that have accumulated during the retention period in the database.

At operation 1010, a scheduled check may be performed to evaluate data at an intermediate storage location 1002. For example, the scheduled check 1010 may verify that data files have been properly staged for transfer to the archival system and that the data files satisfy integrity or completeness criteria. If the scheduled check 1010 determines that conditions are not met, the process 1000 may proceed to an operation 1012 in which an alert for failure may be generated. For example, the alert for failure 1012 may notify administrative personnel or monitoring systems that the archival operation encountered an error, enabling corrective action to be taken.

If the scheduled check 1010 determines that conditions are met, the process 1000 may proceed to an operations file mover 1014. For example, the operations file mover 1014 may transfer operational data files from the intermediate storage location 1002 to a destination storage location within the archival system. For example, the reconciliation file mover 1016 may handle reconciliation data files separately from operational data files to maintain organization within the archival system. In some examples, the reconciliation file mover 1016 may manage any files related to operations performed by the resource authorization system 120 or stand-in engine 140 in association with reconciliation operations and the operations file mover 1014 may manage all other files related to operations performed by the resource authorization system 120 or stand-in engine 140.

The operations file mover 1014 may connect to an operations file deleter 1020. For example, the operations file deleter 1020 may remove operational files from the intermediate storage location 1002 after the files have been processed and transferred. Similarly, the reconciliation file mover 1016 may provide files to a reconciliation file deleter 1018.

Following the operations file deleter 1020, the process 1000 may proceed to a determination 1022. For example, the task successful decision 1022 may evaluate whether the file operations completed without errors. If the task is not successful, the process 1000 may return to the operations file mover 1014 for reprocessing or the process 1000 may stop and initiate an alert. If the task is successful, the process 1000 may proceed to an operation 1024 in which read access may be granted. For example, the operation 1024 may provide access permissions for the archived data to authorized systems or accounts. Similarly, the process 1000 may proceed from the reconciliation file mover 1016 to the determination 1022 and operation 1024 for files managed by the reconciliation file mover 1016.

After files have been processed by the operations file mover 1014, the reconciliation file mover 1016, and any necessary read access grants or other configurations have been issued, the files may be provided to a final immutable audit record location 1026 for storage. For example, the immutable audit record repository 110 may maintain a tamper-evident log of the files. In some embodiments, the immutable audit record repository 110 may implement tamper-evident records using cryptographic chain-of-custody mechanisms to support compliance requirements or fraud management. For example, each file transfer, deletion, or access grant may be logged with cryptographic signatures or hash values that enable detection of any unauthorized modifications to the audit records.

Example Computing Environment

Figure 11:
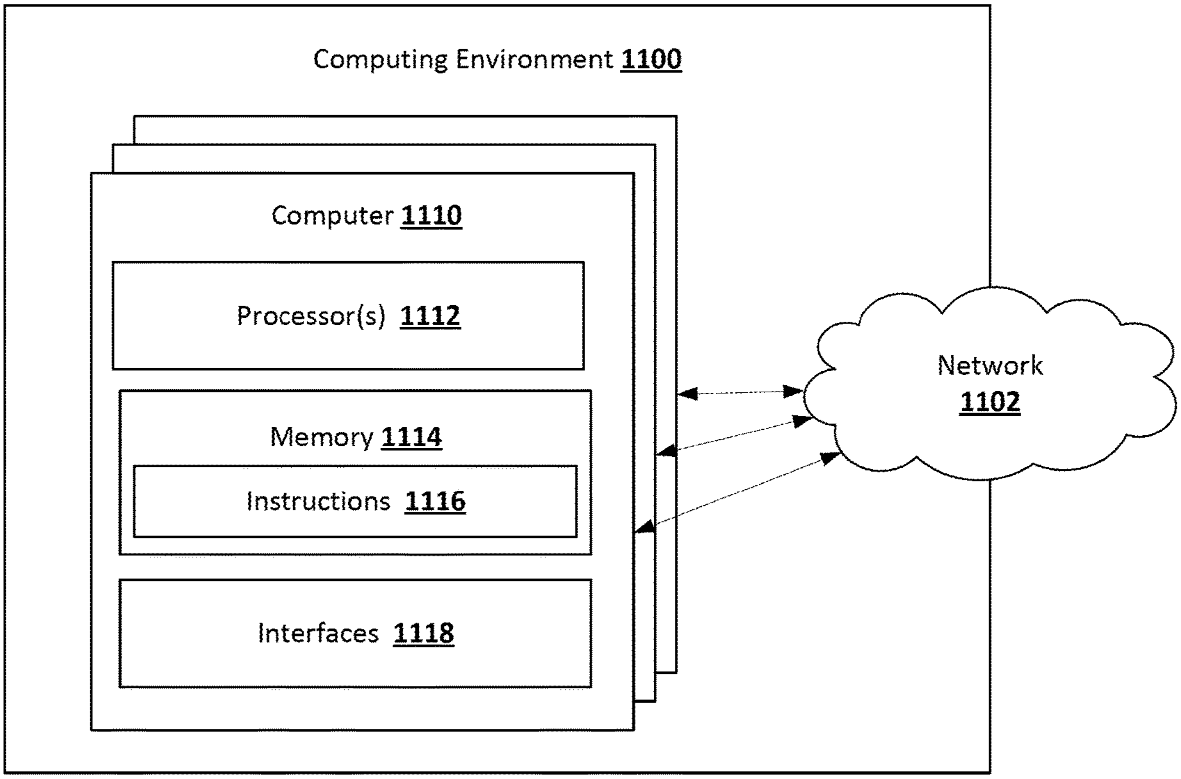
FIG. 11 illustrates an example computing environment for use with embodiments of the present disclosure.

FIG. 11 discloses a computing environment 1100 in which aspects of the present disclosure may be implemented. A computing environment 1100 is a set of one or more virtual or physical computers 1110 that individually or in cooperation achieve tasks, such as implementing one or more aspects described herein. For example, the computers 1110 may represent the resource authorization system 120, stand-in engine 140, immutable audit record repository 110, user devices 202 or 204, or other systems or components shown in FIG. 1, 4, or 5 deployed in a computing environment 1100 connected by at least one network 1102). The computers 1110 have elements that cooperate to cause output based on input. Example computers 1110 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 1100 includes at least one physical computer.

The computing environment 1100 may specifically be used to implement one or more aspects described herein. In some examples, one or more of the computers 1110 may be implemented as a user device, such as the user devices 202 or 204 and others of the computers 1110 may be used to implement aspects of the resource authorization system 120, stand-in engine 140, immutable audit record repository 110 or other systems or components shown in FIG. 1, 4, or 5 or the devices of system 200 shown in FIG. 2, which may include, in some embodiments, a machine learning framework useable to train and deploy models exposed to the devices or provide other functionality, such as through exposed application programming interfaces.

The computing environment 1100 can be arranged in any of a variety of ways, including, but not limited to, the layout illustrated in FIG. 1 or 2. The computers 1110 can be local to or remote from other computers 1110 of the computing environment 1100. The computing environment 1100 can include computers 1110 arranged according to client-server models, peer-to-peer models, edge computing models, other models, or combinations thereof.

In many examples, the computers 1110 are communicatively coupled with devices internal or external to the computing environment 1100 via a network 1102. The network 1102 is a set of devices that facilitate communication from a sender to a destination, such as by implementing communication protocols. Example networks 1102 include local area networks, wide area networks, intranets, or the Internet.

In some implementations, computers 1110 can be general-purpose computing devices (e.g., consumer computing devices). In some instances, via hardware or software configuration, computers 1110 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1110 include one or more processors 1112, memory 1114, and one or more interfaces 1118. Such elements can be virtual, physical, or combinations thereof.

The one or more processors 1112 are elements that execute instructions, such as instructions that obtain data, process the data, and provide output based on the processing. The one or more processors 1112 often obtain instructions and data stored in the memory 1114. The one or more processors 1112 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1112 include at least one physical processor implemented as an electrical circuit. Example providers of processors 1112 include INTEL, AMD, QUALCOMM, TEXAS INSTRUMENTS, and APPLE.

The memory 1114 is a collection of elements configured to store instructions 1116 and data for later retrieval and use. The instructions 1116 can, when executed by the one or more processors 1112, cause execution of one or more operations that implement aspects described herein. In many examples, the memory 1114 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1114 can store information encoded in transient signals.

The one or more interfaces 1118 are elements that facilitate receiving input from and providing output to something external to the computer 1110, such as visual output elements (e.g., displays or lights), audio output elements (e.g., speakers), haptic output elements (e.g., vibratory elements), visual input elements (e.g., cameras), auditory input elements (e.g., microphones), haptic input elements (e.g., touch or vibration sensitive elements), motion input elements (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input elements, or combinations thereof (e.g., a touch sensitive display). The one or more interfaces 1118 can include elements for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via elements configured to communicate via radiofrequency signals, such as according to WI-FI, cellular, BLUETOOTH, ZIGBEE, or other protocols). One or more of the one or more interfaces 1118 can facilitate connection of the computing environment 1100 to a network 1102.

The computers 1110 can include any of a variety of other elements to facilitate the performance of operations described herein. Example elements include one or more power units (e.g., batteries, capacitors, power harvesters, or power supplies) that provide operational power, one or more buses to provide intra-device communication, one or more cases or housings to encase one or more elements, other elements, or combinations thereof.

Example Machine Learning Framework

Figure 12:
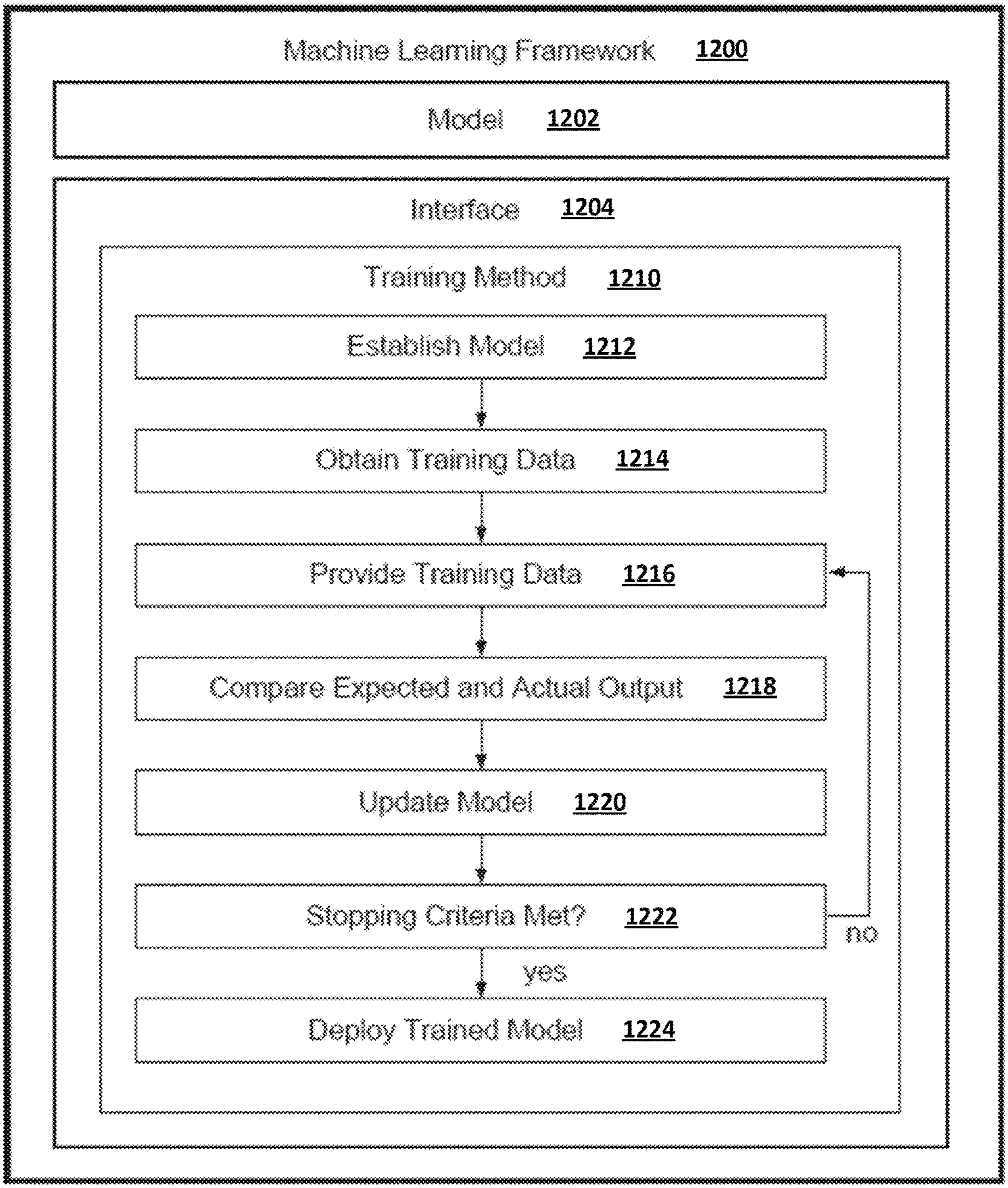
FIG. 12 illustrates an example machine learning framework for use with embodiments of the present disclosure.

FIG. 12 illustrates an example machine learning framework 1200 that techniques described herein may benefit from or improve on. A machine learning framework 1200 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1200 or components thereof are often built or refined from existing frameworks, such as TENSORFLOW by GOOGLE, INC. or PYTORCH by the PYTORCH community.

The machine learning framework 1200 can include one or more models 1202 that are the structured representation of learning and an interface 1204 that supports use of the model 1202. The model 1202 can take any of a variety of forms. In many examples, the model 1202 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1202 can include a representation of memory (e.g., providing long short-term memory functionality). Where the set includes more than one model 1202, the models 1202 can be linked, cooperate, or compete to provide output.

The interface 1204 can include software procedures (e.g., defined in a library) that facilitate the use of the model 1202, such as by providing a way to establish and interact with the model 1202. For instance, the software procedures can include software for receiving input, preparing input for use (e.g., by performing vector embedding, such as using Word2Vec, BERT, or another technique), processing the input with the model 1202, providing output, training the model 1202, performing inference with the model 1202, fine tuning the model 1202, other procedures, or combinations thereof.

In an example implementation, interface 1204 can be used to facilitate a training method 1210 that can include operation 1212. Operation 1212 includes establishing a model 1202, such as initializing a model 1202. The establishing can include setting up the model 1202 for further use (e.g., by training or fine tuning). The model 1202 can be initialized with values. In examples, the model 1202 can be pretrained. Operation 1214 can follow operation 1212. Operation 1214 includes obtaining training data.

In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1202. Operation 1216 can follow operation 1214. Operation 1216 includes providing a portion of the training data to the model 1202. This can include providing the training data in a format usable by the model 1202. The framework 1200 (e.g., via the interface 1204) can cause the model 1202 to produce an output based on the input. Operation 1218 can follow operation 1216. Operation 1218 includes comparing the expected output with the actual output. In an example, this can include applying a loss function to determine the difference between expected and actual. This value can be used to determine how training is progressing.

Operation 1220 can follow operation 1218. Operation 1220 includes updating the model 1202 based on the result of the comparison. This can take any of a variety of forms depending on the nature of the model 1202. Where the model 1202 includes weights, the weights can be modified to increase the likelihood that the model 1202 will produce correct output given an input. Depending on the model 1202, backpropagation or other techniques can be used to update the model 1202.

Operation 1222 can follow operation 1220. Operation 1222 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1214.

If the stopping criterion has been satisfied, the flow can move to operation 1224. Operation 1224 includes deploying the trained model 1202 for use in production, such as providing the trained model 1202 with real-world input data and produce output data used in a real-world process. The model 1202 can be stored in memory 1114 of at least one computer 1110, or distributed across memories of two or more such computers 1110 for production of output data (e.g., predictive data).

In some embodiments, in addition to or instead of relying solely on the core training and inference workflow described above, the machine learning framework may incorporate a retrieval-augmented generation (RAG) capability as an inference-time enhancement. In some such embodiments, a deployed trained model may be augmented at runtime with externally retrieved contextual data obtained from one or more knowledge repositories, without modifying the underlying model parameters, weights, or training process. The retrieval of contextual data, assembly of retrieved context, and execution of augmented inference may be performed outside of and independently from the iterative training loop, such that model weight updates remain decoupled from inference-time augmentation. This architecture enables dynamic knowledge refresh, domain adaptation, and improved inference accuracy while preserving training stability, governance, and reproducibility. In some embodiments, the machine learning framework may further support modular inference pipelines, pluggable data sources for contextual enrichment, or decoupled knowledge stores that evolve independently of the trained model. By way of example, such inference-time augmentation techniques may be applied to various workflows described herein, including, but not limited to, authorization decisioning during stand-in operations, operational state change analysis, reconciliation operations, policy or limit interpretation, or auditing operations.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Hereinafter, various characteristics will be highlighted in a set of numbered embodiments or paragraphs. These characteristics are not to be interpreted as being limiting on the invention or inventive concept, but are provided merely as a highlighting of some characteristics as described herein, without suggesting a particular order of importance or relevancy of such characteristics.

Embodiment 1. A system comprising a resource authorization system and at least one non-transitory computer-readable medium comprising computer program instructions that, when executed by at least one processor, cause the system to maintain, using data received from a resource control system, a proxy state log comprising last-known available resource data.

Embodiment 2. The system of embodiment 1, wherein the computer program instructions, when executed by the at least one processor, further cause the system to, responsive to a first operational state change associated with the resource control system, switch the resource authorization system to a stand-in operational state in which the resource authorization system uses data from the proxy state log without synchronizing with the resource control system.

Embodiment 3. The system of any one of the foregoing embodiments, wherein the computer program instructions, when executed by the at least one processor, further cause the system to update the proxy state log based on a resource access request processed by the resource authorization system during the stand-in operational state.

Embodiment 4. The system of any one of the foregoing embodiments, wherein the computer program instructions, when executed by the at least one processor, further cause the system to, responsive to a second operational state change associated with the resource control system, switch the resource authorization system to a default operational state in which the resource authorization system uses data from the resource control system.

Embodiment 5. The system of any one of the foregoing embodiments, wherein the computer program instructions, when executed by the at least one processor, further cause the system to perform a reconciliation operation to update the resource control system based on the proxy state log.

Embodiment 6. The system of any one of the foregoing embodiments, wherein: the last-known available resource data is associated with a plurality of segregated resource entities; and the last-known available resource data comprises, for each of the plurality of segregated resource entities, at least one of: (i) resource availability data or (ii) resource consumption limit data.

Embodiment 7. The system of any one of the foregoing embodiments, wherein: the data received from the resource control system is received via at least one of: (i) a batch ingestion data pipeline or (ii) a continuous streaming data pipeline; and maintaining the proxy state log comprises continuously updating the proxy state log with the data received from the resource control system.

Embodiment 8. The system of any one of the foregoing embodiments, wherein processing the resource access request comprises: placing a processing lock on a segregated resource entity associated with the resource access request; and determining whether to authorize or deny the resource access request using the proxy state log.

Embodiment 9. The system of any one of the foregoing embodiments, wherein the processing lock is configured to engage during processing of individual resource access requests to enforce sequential processing of a plurality of resource access requests during the stand-in operational state, the plurality of resource access requests comprising the resource access request.

Embodiment 10. The system of any one of the foregoing embodiments, wherein determining whether to authorize or deny the resource access request comprises comparing, using the proxy state log and for the segregated resource entity, the resource access request against at least one of: (i) a resource availability value, (ii) a resource consumption limit, or (iii) resource hold data.

Embodiment 11. The system of any one of the foregoing embodiments, wherein the resource availability value is selected from among a plurality of resource availability values based on a resource availability-state hierarchy for the plurality of resource availability values.

Embodiment 12. The system of any one of the foregoing embodiments, wherein processing the resource access request comprises: authorizing the resource access request; and generating, based on the resource access request, a resource reservation lock for a segregated resource entity associated with the resource access request, the resource reservation lock configured: (i) to characterize a provisional change to the last-known available resource data and (ii) with a predetermined duration to expiration.

Embodiment 13. The system of any one of the foregoing embodiments, wherein updating the proxy state log based on the resource access request comprises updating resource hold data for at least one segregated resource entity associated with the resource access request, the resource hold data characterizing a provisional net change to be applied to the last-known available resource data caused by the resource authorization system processing one or more resource access requests during the stand-in operational state, the one or more resource access requests comprising the resource access request.

Embodiment 14. The system of any one of the foregoing embodiments, wherein the computer program instructions, when executed by the at least one processor, further cause the system to maintain an immutable audit record of activity associated with at least one of: (i) the proxy state log, (ii) the resource authorization system during the stand-in operational state, or (iii) the reconciliation operation.

Embodiment 15. The system of any one of the foregoing embodiments, wherein the immutable audit record comprises data characterizing at least one of: (i) reads and writes for the proxy state log, (ii) updates to the last-known available resource data, (iii) authorization decisions of the resource authorization system during the stand-in operational state, (iv) resource reservation locks, or (v) merges between the proxy state log and one or more data stores of the resource control system.

Embodiment 16. The system of any one of the foregoing embodiments, wherein the reconciliation operation comprises merging data from the proxy state log and data from the immutable audit record with one or more data stores of the resource control system.

Embodiment 17. The system of any one of the foregoing embodiments, wherein the data from the proxy state log and the data from the immutable audit record are merged with the one or more data stores according to one or more deterministic rules using at least one of timestamp data or data version information.

Embodiment 18. The system of any one of the foregoing embodiments, wherein the reconciliation operation comprises clearing expired resource reservation locks based on a corresponding predetermined duration to expiration.

Embodiment 19. The system of any one of the foregoing embodiments, wherein: the proxy state log further comprises segregated resource entity metadata; and processing the resource access request comprises identifying at least one segregated resource entity associated with the resource access request using the segregated resource entity metadata.

Embodiment 20. The system of any one of the foregoing embodiments, wherein: the first operational state change comprises an unplanned outage state; and the first operational state change is identified by monitoring one or more system status indicators for the resource control system to determine the resource control system is unavailable.

Embodiment 21. The system of any one of the foregoing embodiments, wherein the one or more system status indicators comprise at least one of: (i) application program interface response codes, (ii) a message queue depth indicator, (iii) a message queue lag indicator, or (iv) a circuit breaker event.

Embodiment 22. The system of any one of the foregoing embodiments, wherein: the first operational state change comprises a planned outage state; and the first operational state change is identified by receiving an indication of the planned outage state during which the resource control system is unavailable.

Embodiment 23. A method comprising steps in accordance with any one of the foregoing embodiments.

Embodiment 24. At least one non-transitory computer readable medium comprising computer coded instructions therein, wherein the computer coded instructions are configured to, when executed by at least one processor, perform one or more operations in accordance with any one of the foregoing embodiments.

The invention claimed is:

1. A system comprising a resource authorization system and at least one non-transitory computer-readable medium comprising computer program instructions that, when executed by at least one processor, cause the system to:

maintain, using data received from a resource control system, a proxy state log comprising last-known available resource data;

responsive to a first operational state change associated with the resource control system, switch the resource authorization system to a stand-in operational state in which the resource authorization system uses data from the proxy state log without synchronizing with the resource control system;

update the proxy state log based on a resource access request processed by the resource authorization system during the stand-in operational state; and responsive to a second operational state change associated with the resource control system:

switch the resource authorization system to a default operational state in which the resource authorization system uses data from the resource control system; and perform a reconciliation operation to update the resource control system based on the proxy state log.

2. The system according to claim 1, wherein:

the last-known available resource data is associated with a plurality of segregated resource entities; and the last-known available resource data comprises, for each of the plurality of segregated resource entities, at least one of: (i) resource availability data or (ii) resource consumption limit data.

3. The system according to claim 1, wherein:

the data received from the resource control system is received via at least one of: (i) a batch ingestion data pipeline or (ii) a continuous streaming data pipeline; and maintaining the proxy state log comprises continuously updating the proxy state log with the data received from the resource control system.

4. The system according to claim 1, wherein processing the resource access request comprises:

placing a processing lock on a segregated resource entity associated with the resource access request; and determining whether to authorize or deny the resource access request using the proxy state log.

5. The system according to claim 4, wherein the processing lock is configured to engage during processing of individual resource access requests to enforce sequential processing of a plurality of resource access requests during the stand-in operational state, the plurality of resource access requests comprising the resource access request.

6. The system according to claim 4, wherein determining whether to authorize or deny the resource access request comprises comparing, using the proxy state log and for the segregated resource entity, the resource access request against at least one of: (i) a resource availability value, (ii) a resource consumption limit, or (iii) resource hold data.

7. The system according to claim 6, wherein the resource availability value is associated with a resource availability category selected from among a plurality of resource availability categories based on a resource availability-state hierarchy for the plurality of resource availability categories.

8. The system according to claim 1, wherein processing the resource access request comprises:

authorizing the resource access request; and generating, based on the resource access request, a resource reservation lock for a segregated resource entity associated with the resource access request, the resource reservation lock configured: (i) to characterize a provisional change to the last-known available resource data and (ii) with a predetermined duration to expiration.

9. The system according to claim 1, wherein updating the proxy state log based on the resource access request comprises updating resource hold data for at least one segregated resource entity associated with the resource access request, the resource hold data characterizing a provisional net change to be applied to the last-known available resource data caused by the resource authorization system processing one or more resource access requests during the stand-in operational state, the one or more resource access requests comprising the resource access request.

10. The system according to claim 1, wherein the computer program instructions, when executed by the at least one processor, further cause the system to maintain an immutable audit record of activity associated with at least one of: (i) the proxy state log, (ii) the resource authorization system during the stand-in operational state, or (iii) the reconciliation operation.

11. The system according to claim 10, wherein the immutable audit record comprises data characterizing at least one of: (i) reads and writes for the proxy state log, (ii) updates to the last-known available resource data, (iii) authorization decisions of the resource authorization system during the stand-in operational state, (iv) resource reservation locks, or (v) merges between the proxy state log and one or more data stores of the resource control system.

12. The system according to claim 10, wherein the reconciliation operation comprises merging data from the proxy state log and data from the immutable audit record with one or more data stores of the resource control system.

13. The system according to claim 12, wherein the data from the proxy state log and the data from the immutable audit record are merged with the one or more data stores according to one or more deterministic rules using at least one of timestamp data or data version information.

14. The system according to claim 1, wherein the reconciliation operation comprises clearing expired resource reservation locks based on a corresponding predetermined duration to expiration.

15. The system according to claim 1, wherein:

the proxy state log further comprises segregated resource entity metadata; and processing the resource access request comprises identifying at least one segregated resource entity associated with the resource access request using the segregated resource entity metadata.

16. The system according to claim 1, wherein:

the first operational state change comprises an unplanned outage state; and the first operational state change is identified by monitoring one or more system status indicators for the resource control system to determine the resource control system is unavailable.

17. The system according to claim 16, wherein the one or more system status indicators comprise at least one of: (i) application program interface response codes, (ii) a message queue depth indicator, (iii) a message queue lag indicator, or (iv) a circuit breaker event.

18. The system according to claim 1, wherein:

the first operational state change comprises a planned outage state; and the first operational state change is identified by receiving an indication of the planned outage state during which the resource control system is unavailable.

19. A method comprising:

maintaining, using data received from a resource control system, a proxy state log comprising last-known available resource data;

responsive to a first operational state change associated with the resource control system, switching a resource authorization system to a stand-in operational state in which the resource authorization system uses data from the proxy state log without synchronizing with the resource control system;

updating the proxy state log based on a resource access request processed by the resource authorization system during the stand-in operational state; and responsive to a second operational state change associated with the resource control system:

switching the resource authorization system to a default operational state in which the resource authorization system uses data from the resource control system; and performing a reconciliation operation to update the resource control system based on the proxy state log.

20. At least one non-transitory computer-readable medium comprising computer coded instructions therein, wherein the computer coded instructions are configured to, when executed by at least one processor:

maintain, using data received from a resource control system, a proxy state log comprising last-known available resource data;

responsive to a first operational state change associated with the resource control system, switch a resource authorization system to a stand-in operational state in which the resource authorization system uses data from the proxy state log without synchronizing with the resource control system;

update the proxy state log based on a resource access request processed by the resource authorization system during the stand-in operational state; and responsive to a second operational state change associated with the resource control system:

switch the resource authorization system to a default operational state in which the resource authorization system uses data from the resource control system; and perform a reconciliation operation to update the resource control system based on the proxy state log.

* * * * *